United States Patent
Soumiya et al.

[19]

[11] Patent Number: 5,818,818
[45] Date of Patent: Oct. 6, 1998

[54] COMMUNICATION SERVICE QUALITY CONTROL SYSTEM

[75] Inventors: Toshio Soumiya; Takeshi Kawasaki; Masafumi Katoh, all of Kanagawa, Japan

[73] Assignee: Fujitsu Limited, Kanagawa, Japan

[21] Appl. No.: 677,665

[22] Filed: Jul. 8, 1996

[30] Foreign Application Priority Data

Sep. 26, 1995 [JP] Japan .................................. 7-247865

[51] Int. Cl.⁶ ...................................................... H04J 3/24
[52] U.S. Cl. .......................................... 370/252; 370/412
[58] Field of Search ..................................... 370/395, 389, 370/396, 229, 230, 231, 234, 235, 237, 411, 412, 413, 414, 415, 417, 418, 419, 397, 400, 253, 254, 252, 428, 429, 458, 477, 468

[56] References Cited

U.S. PATENT DOCUMENTS

| | | | |
|---|---|---|---|
| 332,379 | 12/1885 | Kakuma et al. | 454/339 |
| 353,499 | 11/1886 | Kakuma et al. | 48/144 |
| 5,235,595 | 8/1993 | O'Doud | 370/392 |
| 5,379,297 | 1/1995 | Gloves et al. | 370/399 |
| 5,521,916 | 5/1996 | Choudhury et al. | 370/414 |
| 5,555,243 | 9/1996 | Kakuma et al. | 370/352 |
| 5,555,265 | 9/1996 | Kakuma et al. | 370/395 |
| 5,696,764 | 12/1997 | Soumiya et al. | 370/395 |

FOREIGN PATENT DOCUMENTS

| | | |
|---|---|---|
| 07240752 | 9/1995 | Japan . |
| 9401199 | 6/1996 | Japan . |

*Primary Examiner*—Dang Ton
*Attorney, Agent, or Firm*—Helfgott & Karas, P.C.

[57] ABSTRACT

A cell buffer is provided for storage of cells for each quality class. A counter is provided for each cell buffer. A threshold value which regulates the respective readout interval is set for each quality class. The count of the counter for each quality class is increased by 1 for each time slot. When the count for a certain quality class reaches the threshold value, if a cell is stored in the cell buffer for that quality class, that cell is read out and output, and, at the same time, the count is decreased by the threshold value. When the count for a certain quality class reaches the threshold value, if a cell is not stored in the cell buffer for that quality class, the count is left unchanged.

29 Claims, 18 Drawing Sheets

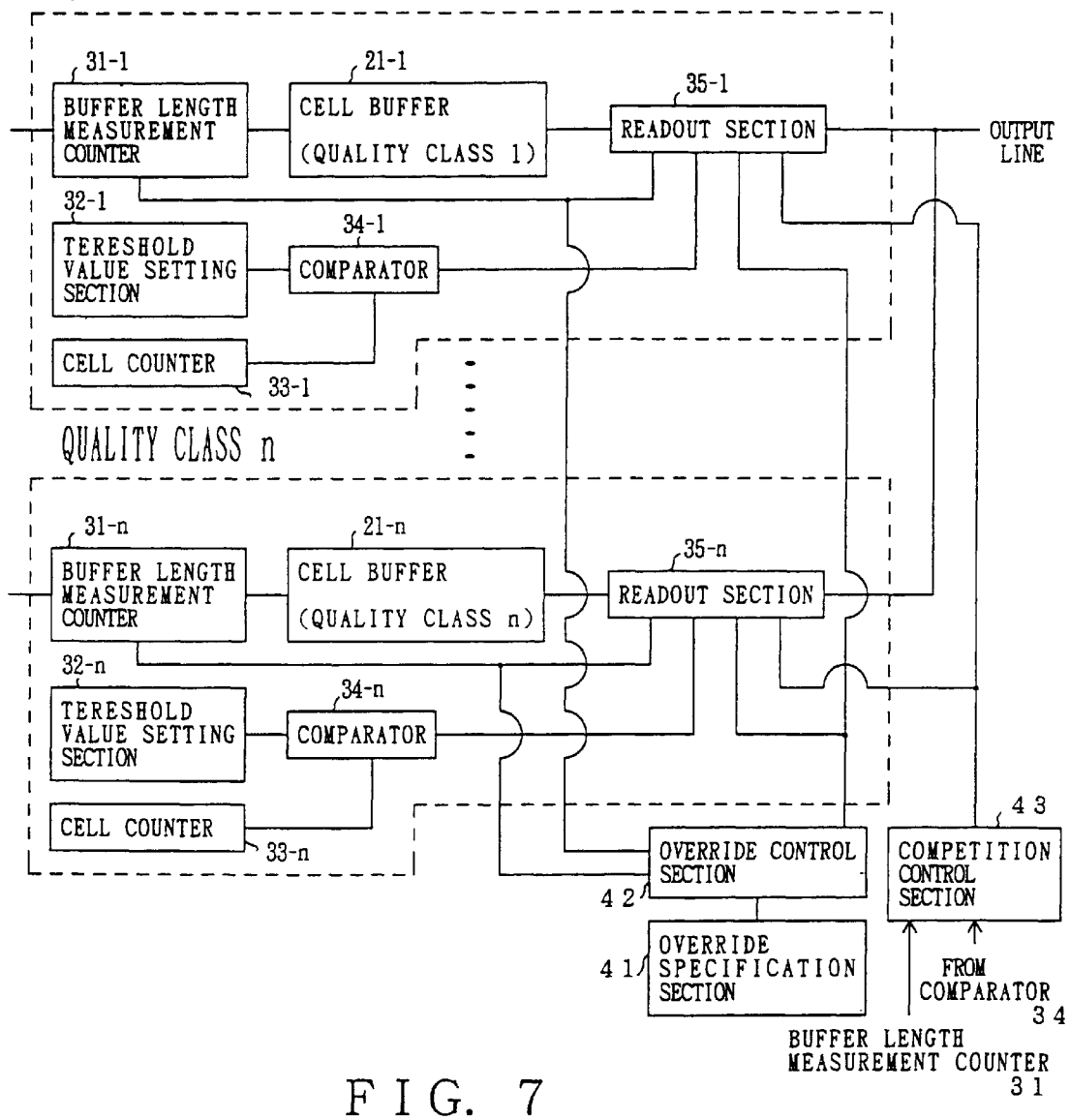
F I G. 7

| QUALITY CLASS | SPECIFICATION | PRIORITY |
|---|---|---|
| CLASS 1 | 0 | — |
| CLASS 2 | 0 | — |
| CLASS 3 | 1 | 3 |
| CLASS 4 | 1 | 2 |
| CLASS 5 | 1 | 1 |

FIG. 8

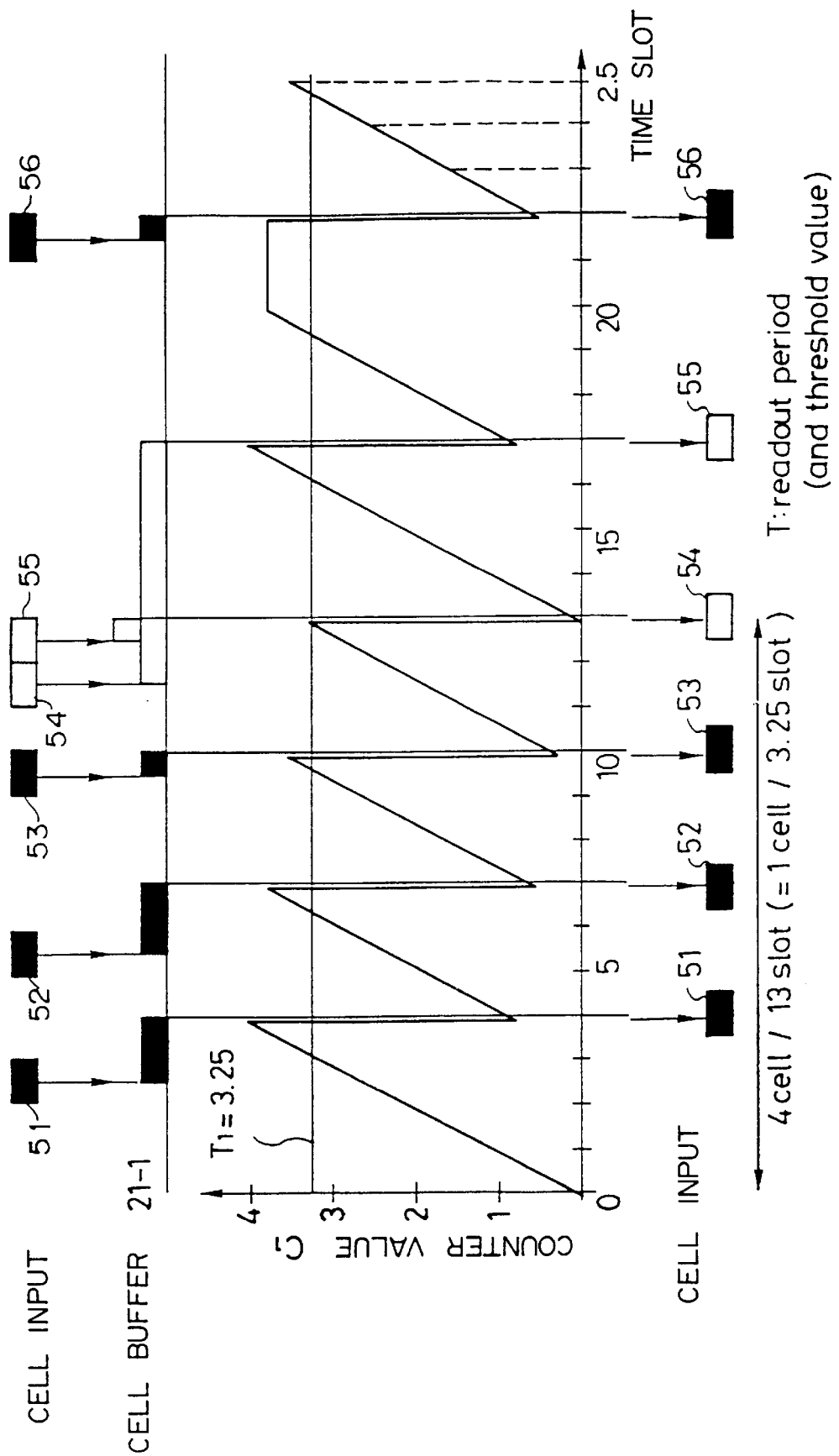
F I G. 9

|  | AVERAGE DELAY | 99% DELAY |
|---|---|---|
| METHOD 1 | 137.4 μs | 1281 μs |
| METHOD 2 | 195.9 | 943.7 |
| METHOD 3-1 | 23.20 | 228.8 |
| METHOD 3-2 | 76.59 | 580.4 |

FIG. 12

COMMUNICATION SERVICE QUALITY CONTROL SYSTEM

BACKGROUND OF THE INVENTION

1. Field of the Invention

This invention relates to a communication service quality control system. Specifically, it relates to quality control for each service in an ATM network.

2. Description of the Related Art

Until now, when communication services such as voice communication, data communication and video communication have been provided, an independent network (for example, telephone network, packet communication network, CATV network, etc.) has been set up for each one. However, in a system in which a separate network is set up for each service, it is difficult to use the network resources effectively, which is undesirable from the point of view of cost. For this reason, considerable research and development work has been done on broadband ISDN as a next generation communications network that unifies these various services. ATM, which is the core technology of broadband ISDN, is now entering the stage of practical use.

ATM is a communication system which uses 53-byte fixed-length packets called cells to transfer information. An ATM cell consists of a 5-byte header including VPI/VCI which specifies the communication path and a 48-byte information field in which the information to be transferred is stored. In ATM, high-speed communication is achieved by eliminating functions such as cell resending from the exchange equipment. In addition, ATM performs variable rate communication by controlling the number of cells that are transferred.

The various services such as those listed above have different quality requirements with respect to the network. For example, in voice communication, if some of the cells are lost the drop in sound quality is only slight, but if cell transfer is delayed the sound will be irritating to listen to. So the quality requirement with respect to cell loss is not very strict, but the quality requirement with respect to transfer delay is quite strict. On the other hand, in data communication, cell transfer delay poses practically no problem, but if cell loss occurs it will become impossible to obtain correct data, so the quality requirement with respect to transfer delay is not very strict, whereas the quality requirement with respect to cell loss is quite strict. Thus, an ATM network includes services with a variety of quality requirements.

FIG. 1 is a diagram explaining the quality control system in an existing ATM network. This system is called a cell-discarding control system. That is to say, a cell buffer is set up inside the ATM exchange equipment; and a threshold value that specifies a queue length (cell accumulation amount) with respect to that cell buffer is set. Cells that are input into the ATM exchange equipment are written into this buffer temporarily and then read out with specified timing. As the number of cells input to the ATM exchange equipment by many users increases, the amount of cell accumulation inside the cell buffer increases, and the queue becomes longer. If this queue length exceeds the threshold value Tx, cells to which low priority are assigned are. discarded without being stored any longer in the cell buffer, while cells with high priority continue to be stored in the cell buffer. The cell priority is judged from a CLP (Cell Loss Priority) bit in the header or tag information used inside the exchange equipment.

However, in this system, as the services provided become more varied it becomes difficult to guarantee the quality required for each service. That is to say, if the threshold value is set to be large, it becomes easy to provide guarantees with respect to the cell loss rate (cell discarding), but the delay becomes long. Conversely, if the threshold value is set to be small in order to shorten the delay, it becomes impossible to provide guarantees with respect to the cell loss rate.

Setting up a different cell buffer for each service has been proposed as one way to solve this problem. In this system, if the amount of traffic on one service increases and it becomes necessary to discard cells with respect to the cell buffer for that service, there is no effect on the quality of other services. However, the problem of the order in which cells stored in the different cell buffers should be read out is still unsolved.

One proposed readout control system is to set up a readout band for each cell buffer in advance, and read the cells out of that band in accordance with time divisions. However, if this band is set up in a fixed manner, readout time slots will also be assigned for cell buffers in which no cells to be transferred are stored, and during this time, even if there are cells stored in other cell buffers, those cells will not be read out, lowering the cell transfer efficiency. Thus, since ATM unifies a number of services with different quality requirements, quality control is difficult.

SUMMARY OF THE INVENTION

This invention has the objective of providing control that will increase the efficiency of use of exchange equipment and transmission paths while satisfying user service quality requirements.

The quality control system of this invention is applied to a network which autonomously exchanges fixed-length packets, each consisting of a header field that includes routing information and an information field, in accordance with that routing information, and controls the quality for different quality classes, each corresponding to one of the communication services provided by that network.

Buffers for storing fixed-length packets are set up for each quality class. A counter in which a threshold value is set is provided for each buffer. The control unit for each of the plurality of counters increments that counter value after the unit of time required to process 1 fixed-length packet; at the same time, fixed-length packets are read out of buffers corresponding to counters for which the counter value is equal to or greater than the threshold value and the counter values for those counters are decreased by the threshold values.

Priorities are assigned to each of the plurality of quality classes. If a condition exists in which fixed-length packets are to be read out of the plurality of buffers, the control unit reads fixed-length packets out from the plurality of buffers starting from the buffer for the quality class for which the highest priority is set.

BRIEF DESCRIPTION OF THE DRAWINGS

FIG. 7 A block diagram of a quality control buffer.

FIG. 8 An example of the settings in the override specification section.

FIG. 9 A diagram explaining the basic action of the quality control buffer.

FIG. 12 The result of a simulation of delay in a quality control buffer.

DETAILED DESCRIPTION OF THE INVENTION

Figure 1:
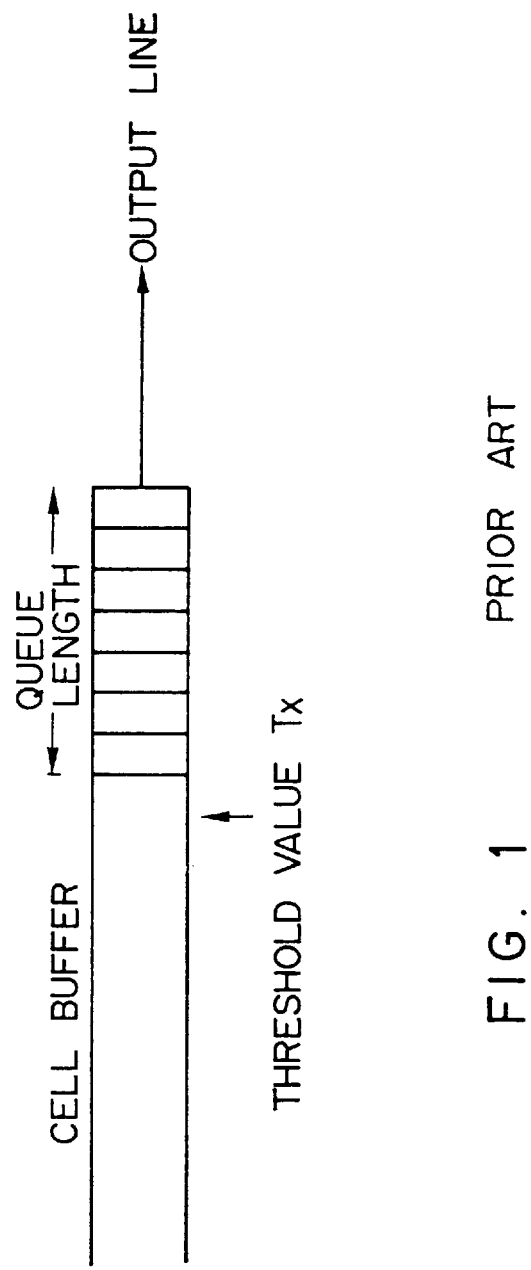
FIG. 1 A diagram explaining the quality control system in an existing ATM network.
Figure 2:
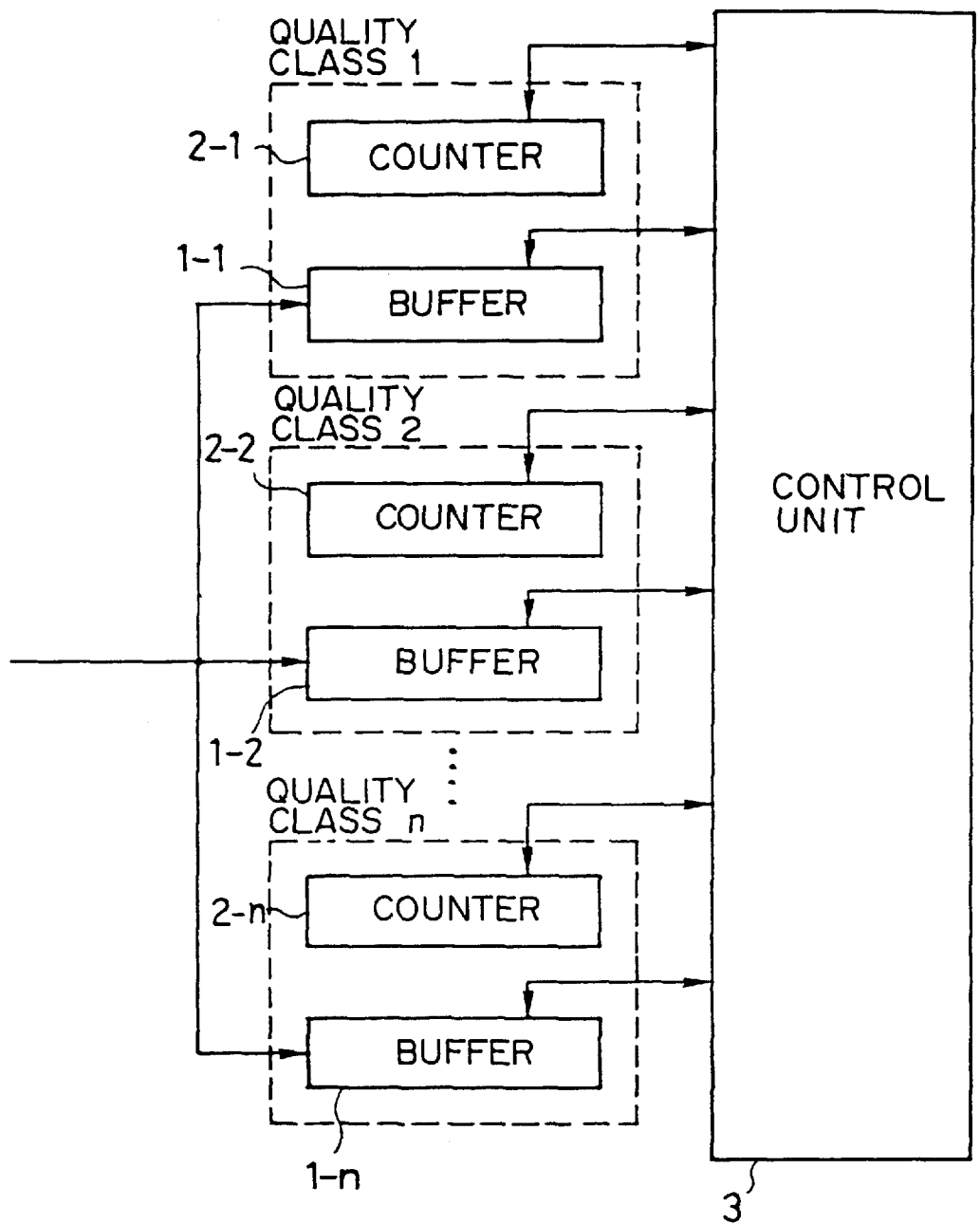
FIG. 2 A block diagram explaining the principle of this invention.

The principle of this invention will be explained with reference to FIG. 2.

This invention is for use in a network (such as an ATM network) in which fixed-length packets, each consisting of a header field including routing information and an information field in which information to be transferred is stored, are exchanged autonomously in accordance with that routing information. It is required that the system controls the qualities of a plurality of quality classes into which the communication services provided by that network are classified.

A plurality of buffers 1-1 to 1-n are provided-for the quality classes; fixed-length packets of the corresponding quality classes are stored in them. If a common buffer configuration is used, fixed-length packets are stored in the common buffer (not shown in the figure), and the address into which each fixed-length packet is written in the common buffer is stored in the plurality of buffers 1-1 to 1-n provided for each quality class.

A plurality of counters 2-1 to 2-n is provided for the plurality of buffers 1-1 to 1-n, and a threshold value is specified for each.

The control unit 3 increments the count values of the counters 2-1 to 2-n every time slot (unit of time that it takes to process 1 fixed-length packet), and, at the same time, reads fixed length packets out of each buffer for which the count is equal to or greater than the threshold value, and decreases those counts by the threshold values. In addition, if a fixed length packet is not stored in a buffer for which the count is equal to or greater than the threshold value, the control unit 3 controls that counter so that its count is not incremented.

In the control described above, the threshold values regulate the intervals at which fixed-length packets are read out of the buffers corresponding to each quality class. In addition, if we let $T_i$ ($i=1, 2, 3, \ldots$) be the threshold value set for each counter, $RB_i$ the band within which the quality required for each quality class can be guaranteed, and PB the output line physical band, then, if the threshold values are set so that $T_i = PB/RB_i$, then in each quality class the quality is guaranteed by the readout intervals (cell readout rates) regulated by the corresponding threshold values.

Priority information is set for each quality class. If a situation develops in which cells are to be read out for a plurality of quality classes (fixed-length packets are stored in a plurality of buffers, and, in addition, the counts of the counters corresponding to the plurality of buffers are equal to or greater than the respective threshold values), then the control unit 3 reads a fixed-length packet out from the buffer among the plurality of buffers for which the highest priority has been set. In this way priority control among the quality classes can be applied.

A certain quality class is given the right to use open time slots (empty time slot) with priority. If there is a situation in which there is no buffer from which a fixed-length packet is to be read (no quality class for which the count is equal to or greater than the threshold value, or there is no fixed-length packet stored in any buffer for which the count is equal to or greater than the threshold value), then the control unit 3 reads a fixed-length packet out of the buffer for the quality class to which the above-mentioned right has been given. In this way, the bands are used efficiently.

DESCRIPTION OF THE PREFERRED EMBODIMENT

An embodiment of this invention will now be explained with reference to the drawings. This invention is for use in a network in which fixed-length packets are autonomously routed in accordance with routing information set in those fixed-length packets. The following explanation is for the case of use in an ATM network, but other applications are also possible, for example in SMDS communication.

Figure 3:
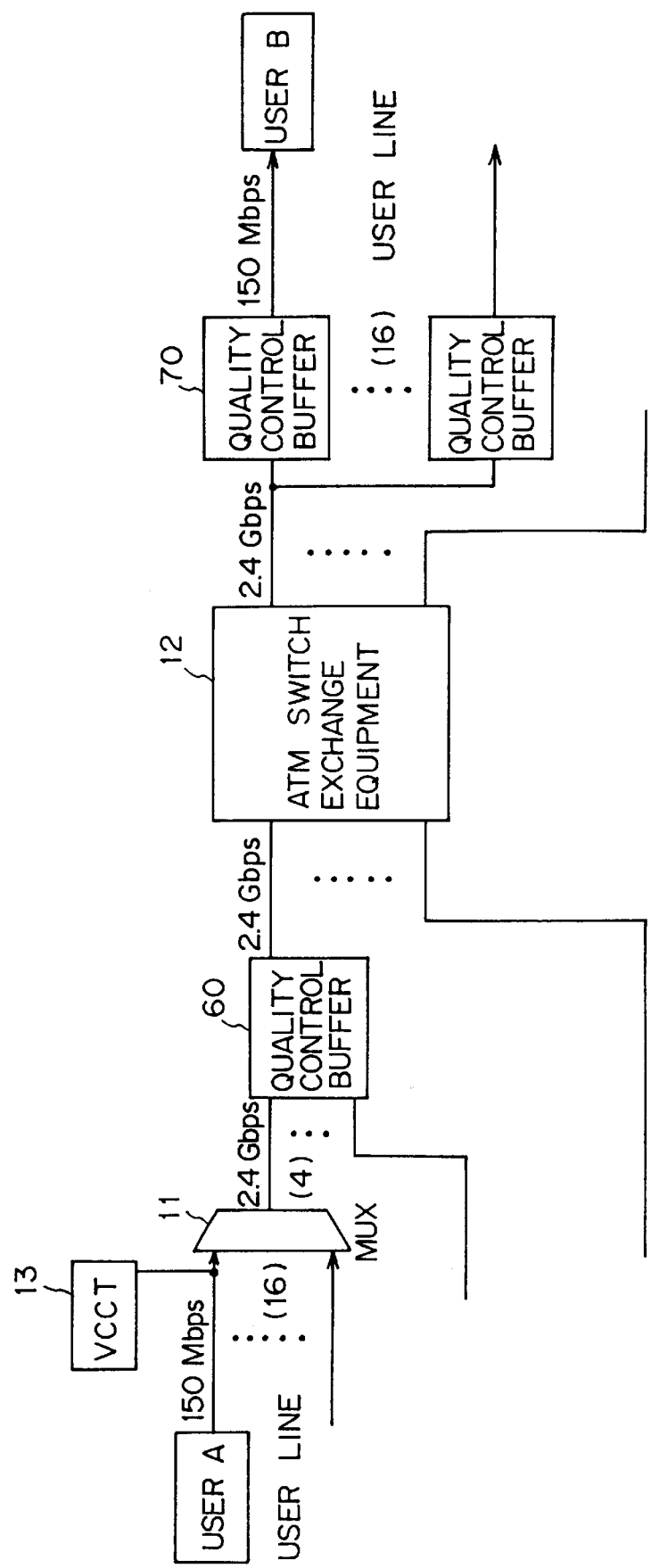
FIG. 3 A block diagram showing the configuration of an ATM network.

FIG. 3 shows the configuration of an ATM network. Cells input from a large number of user lines or cells transferred from other exchange equipment are multiplexed by the multiplexing unit 11 and input to the ATM switch 12. In the example shown in FIG. 3, there are 16 lines with 150 Mbps bands and the cells are input into the ATM switch 12 at the rate of 2.4 Gbps. The ATM switch 12 outputs those cells to specified output lines in accordance with the routing information set in each cell.

When a cell is transferred from user A to user B, user A sets a VPI/VCI that specifies the route to user B in the header of that cell and transfers the cell to the ATM switch 12. At this time, reference is made to the VCI conversion table 13, and the tag information and output VPI/VCI are fetched in accordance with the VPI/VCI set in the input cell. Then the tag information is attached to the input cell and, at the same time, the VPI/VCI set in the input cell is rewritten to the output VPI/VCI, and the cell is input to the ATM switch 12. The ATM switch 12 switches that cell in accordance with the tag information, and outputs that cell to the output line that connects to user B.

The quality control buffer of this invention is installed either on the input side of the ATM switch 12 (multiplex concentrating section: quality control buffer 60), or on the output side of the ATM switch 12 (multiplex distributing section: quality control buffer 70). Also, the ATM switch 12 itself can be configured with the quality control buffer of this invention.

The ATM network provides variety kinds of services such as voice communication, video communication, and data communication. Each service requires a service quality which relates to cell loss rate (cell discarding rate), transfer delay, and so forth. The quality control of this invention manages to guarantee the quality of the services.

Figure 4:
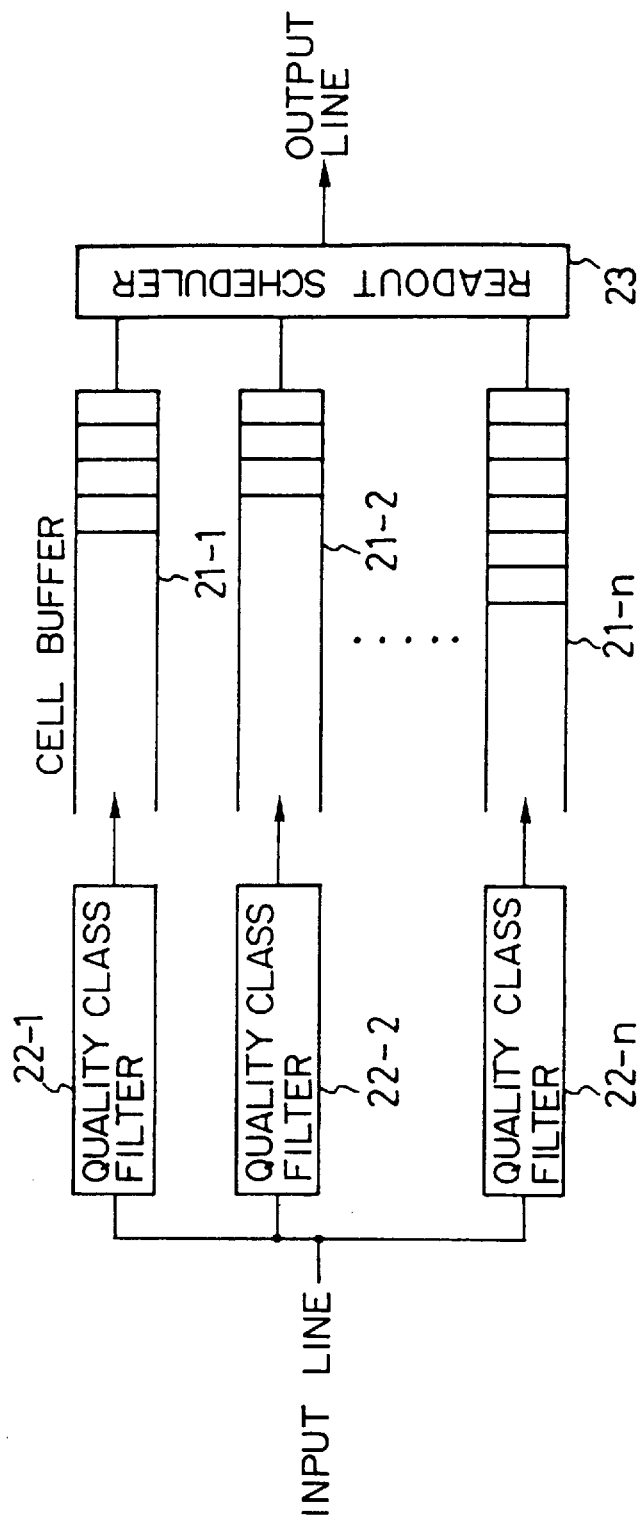
FIG. 4 A block diagram explaining the concept of a quality control buffer.

FIG. 4 is a block diagram which explains the concept of the quality control buffer. Cell buffers 21-1, 21-2, . . . , 21-n are provided for each quality class. The quality classes are classified according to the quality which each service requires of the exchange equipment (QOS: Quality of Service). For example, in an ATM forum, the respective services are classified into 5 categories in accordance with the transfer rate that is declared by each service, the parameter related to the transfer delay, etc. That is to say, they are classified into CBR (Continuous Bit Rate), rt-VBR (real time Variable Bit Rate), nrt-VBR (non-real time Variable Bit Rate), ABR (Available Bit Rate) and UBR (Unspecified Bit Rate). The cell buffers 21-1, 21-2, . . . , 21-n are set up to correspond to, for example, these 5 categories.

The quality classes are not limited to the above-mentioned categories, but can be set arbitrarily to correspond to the application. For example, the quality classes can also be set up in accordance with the cell loss rate (cell discarding rate).

Quality class filters 22-1, 22-2, . . . , 22-n are set up for the respective cell buffers 21-1, 21-2, . . . , 21-n. Each quality class filter 22-1, 22-2, . . . , 22-n passes only cells of the specified quality class. For example, the quality class filter 22-1 passes only the cells in which quality class 1 is set; those cells are written into the cell buffer 21-1.

The readout scheduler 23 reads out cells stored in the cell buffers 21-1, 21-2, . . . , 21-n in accordance with the procedure to be described below, and outputs them to the output line. The readout scheduler 23 reads a cell out of one of the cell buffers 21-1, 21-2, . . . , 21-n and outputs it to the output line during each time slot. If there is no cell to be read out stored in any of the cell buffers 21-1, 21-2, . . . , 21-n, then that time slot becomes an empty cell.

Next, the method of setting the quality classes for each cell will be explained the method of setting the quality classes for each cell. In the ATM, when a call is established, the type of service, cell transfer rate, transfer destination information, etc. are declared by signaling. The exchange equipment judges whether or not these declared values can be accepted by CAC (Call Admission Control). If they can be accepted, then an unused VPI/VCI is secured, and that secured VPI/VCI is posted to the user who is trying to set the call. At this time, in the VCI conversion table 13, output VPI/VCI and tag information are set corresponding to the secured VPI/VCI. The user who receives the secured VPI/VCI sets the received VPI/VCI in each cell and transfers those cells to the exchange equipment.

Figures 5A, 5B:
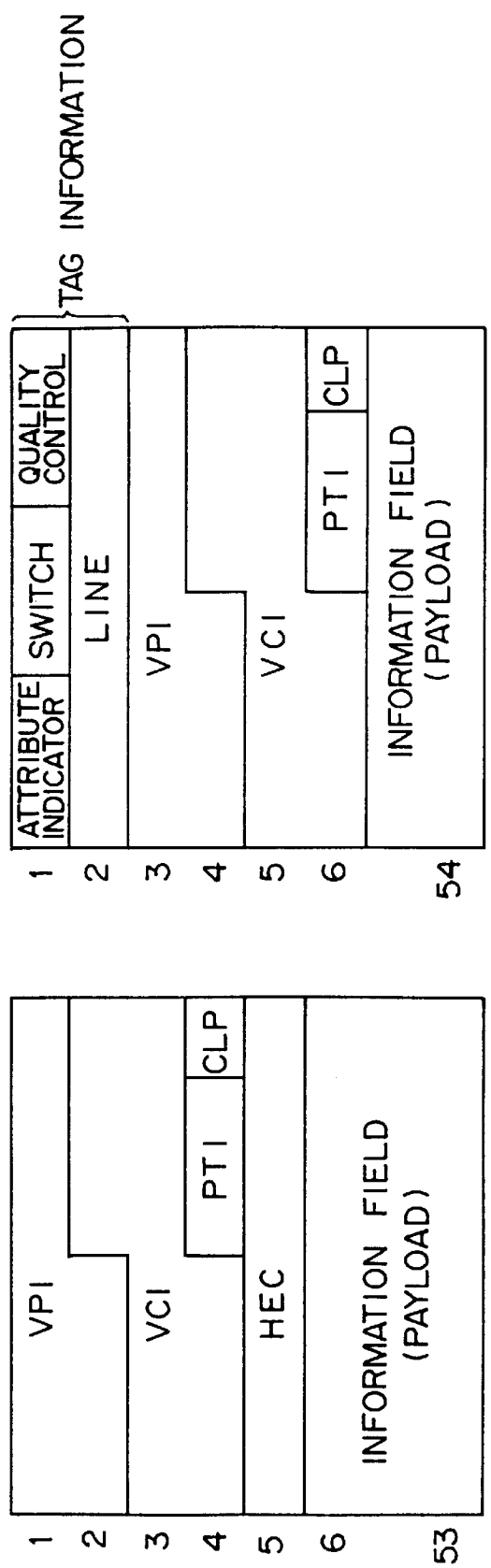
FIG. 5A A diagram showing the format of a cell on the line.
FIG. 5B A diagram showing the format of a cell in the exchange equipment.

FIG. 5A shows the format of a cell on the line. A cell on the line consists of a 5-byte header and a 48-byte information field (payload). The header consists of the VPI/VCI, a PTI that identifies the type of payload, a CLP that gives the cell loss priority, and an HEC that is used for header error detection and cell synchronization.

Figure 6:
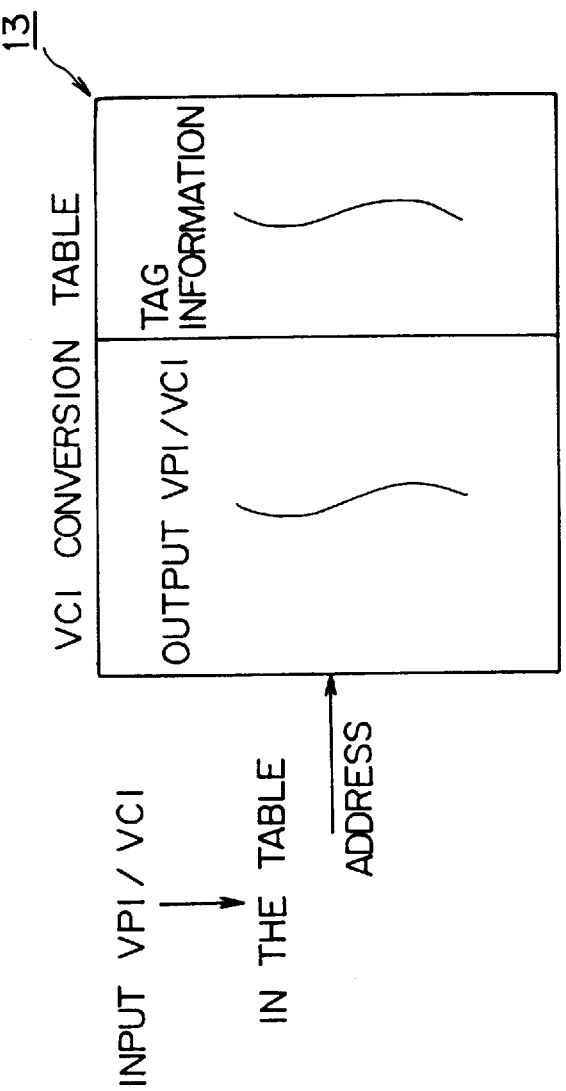
FIG. 6 A diagram showing the VCI exchange table.

FIG. 6 is a diagram that schematically shows the VCI conversion table 13. In the VCI conversion table 13, the output VPI/VCI and the tag information corresponding to the input cell VPI/VCI are set.

When the cell shown in FIG. 5A is input to the exchange equipment, the VCI conversion table 13 is accessed. That is to say, the VCI conversion table 13 is searched using the VPI/VCI set in the input cell, and the output VPI/VCI and the tag information corresponding to that VPI/VCI are fetched. Then the VPI/VCI set in the input cell is rewritten to the output VPI/VCI, and, at the same time, the tag information is appended. The cell for which the VPI/VCI has been rewritten and the tag information has been appended is input to the exchange equipment (ATM switch 12).

FIG. 5B shows one form that the format of a cell in the exchange equipment can have. The format shown in FIG. 5B is the format of a cell in which the header has been converted in the input section of the exchange equipment. Tag information consisting of 2 bytes has been added to the start of the cell in the exchange equipment; following that tag information, the header field and the information field (payload) are stored. The tag information is sometimes considered part of the header, together with the 4 bytes of information following the tag information.

The attribute indicator tag is (for example) a bit which indicates whether that cell is to be sent in point-to-point communication or point-to-multipoint communication. The switch tag specifies the route (path) through which the cell passes inside the ATM switch 12. The quality control tag specifies the quality class. If, for example, the 5 categories proposed in the ATM forum are used as the quality class categories, then is sufficient for the quality control tag to consist of 3 bits of information. The line tag specifies the output line.

Thus, a quality control tag (quality class number) that specifies the quality class is appended as the tag information when a cell is input to the exchange equipment. Consequently, if the tag information of the input cell is detected, the quality class of that cell can be identified. In FIG. 4, the quality class filters 22-1, 22-2, . . . , 22-n detect the tag information of the cells that are input and determine whether or not to allow those cells to pass. The cells that are passed are then written into the cell buffers 21-1, 21-2, . . . , 21-n corresponding to the quality classes of those cells.

FIG. 7 is a block diagram of the quality control buffer. In FIG. 7, the configurations of the latter stages of the quality class filters 22-1, 22-2, . . . , 22-n that are shown in FIG. 4 are shown.

A quality control buffer consists of separate sections provided for each quality class, and a common section provided for common use by all of the quality classes. The configurations of the separate sections for each quality class are all the same, so the explanation here will be confined to the section for quality class 1.

A cell that passes through the quality class filter 22-1 is written into the cell buffer 21-1. The buffer length measurement counter 31-1 measures the buffer length of the cell buffer 21-1 (the number of cells stored in the cell buffer 21-1). The buffer length measurement counter 31-1 increments the count when a cell is written into the cell buffer 21-1, and decrements the count when the readout 35-1 reads a cell out of the buffer 21-1.

The threshold value setting section 32-1 sets a threshold value of the quality class 1 according to software. The method of setting threshold values will be described below. The cell counter 33-1 performs counting with the passage of time and as quality class 1 cells are input and output. The action of the cell counter 33-1 will be described in detail below. The comparator 34-1 compares the count of the cell counter 33-1 to the threshold value set in the threshold value setting section 32-1, and posts the result of that comparison to the readout section 35-1. The readout section 35-1 reads cells out of the cell buffer 21-1 with the passage of time and in accordance with various types of control signals.

The common section includes the override specification section 41, the override control section 42 and the competition control section 43. The override specification section 41 is set to specify or not to specify an override for each quality class. If overrides are specified for a plurality of quality classes, the order of priority is also specified.

FIG. 8 shows an example of settings of the override specification section 41. In the example shown in FIG. 8, there are 5 quality classes, and overrides are specified for quality classes 3 to 5. The highest override priority is assigned to quality class 5.

The override control section 42 transfers readout control signals for the readout sections of the specified quality classes in accordance with the buffer lengths of the cell buffers 21-1, 21-2, . . . , 21-n and the information set in the override specification section 41.

Competition priority information is stored in the competition control section 43. Competition priority information is information that specifies from which cell buffer a cell is to be read out when a situation exists in which there are cells to be read out for a plurality of quality control classes. This information is preset by software. The competition control section 43 receives the counts of the buffer length counters 31-1, 31-2, . . . , 31-n for each quality class and the results of comparison by the comparators 34-1, 34-2, . . . , 34-n; when it is recognized that there is a situation in which cells can be read out for a plurality of quality classes, readout control signals are transferred to the readout sections for the specified quality classes in accordance with the competition priority information. That is to say, the readout control section specifies readout for the quality class to which the highest priority has been assigned.

In FIG. 7, the readout sections 35-1, 35-2, . . . , 35-n are shown as being independent for each quality class, but there can also be a common readout section for all of the quality classes.

FIG. 9 is a diagram that explains the basic action of the quality control buffer. The action for one quality control class (which is taken to be quality class 1) will now explained.

The threshold value T1 for quality class 1 is set to 3.25. The threshold value T1 is determined by equation (1) below.

$$\text{threshold value } T1 = \text{band } PB/\text{band } RB1 \quad (1)$$

The band PB is the output line physical band. If the quality control buffer described here is taken to be the quality control buffer 60 installed on the input side (the multiplex concentrating section) of the ATM switch 12 shown in FIG. 3, then the output line physical band is 2.4 Gbps. The band RB1 is a band that is necessary in order to guarantee the quality required of quality class 1. The quality (such as cell discarding rate) required of each quality class is preset. The CAC manages the transfer rates that are declared when each call is established. Consequently, by referring to this information, it is possible to seek the bands necessary to guarantee the quality required of each quality class. In this example, the band RB1=0.7385 Gbps. Accordingly, the threshold value is obtained as T1=2.4/0.7385=3.25.

The count C1 of the cell counter 33-1 is basically varied in accordance with the rules (a) to (c) given below. The following rules are not always applied in the competition control and override control to be described below.

rule (a): Increment 1 count each time slot.
rule (b): When a cell is read out of cell buffer 22-1 in a given time slot, the count is not incremented, but is decreased by the threshold value T1 (3.25).
rule (c): if the count C1 is equal to or greater than the threshold value T1, the incrementing of rule (a) above is not performed.

Next, a specific explanation about the cell readout algorithm will be given. In FIG. 9, the count C1 and the readout action are shown when cells 51 to 56 are written into the cell buffer 22-1. Here it is assumed that the count C1 is 0 in time slot 0. If the output line physical band is 2.4 Gbps, then the 1 time slot time is about 180 nsec.

The following 2 conditions are set for reading cells out of the cell buffer 22-1. Condition (a) is sometimes ignored in accordance with the override control to be described below.
condition (a): the count C1 is equal to or greater than the threshold value T1.
condition (b): One or more cells are stored in the cell buffer 22-1.

When condition (a) above is satisfied, the cell readout right is given to quality class 1. When conditions (a) and (b) above are satisfied, quality class 1 is in "a condition in which a cell can be read out". In other words, if neither condition (a) nor condition (b) above is satisfied, quality class 1 is in a "condition in which a cell cannot be read out". If a plurality of classes are simultaneously in "a condition in which a cell can be read out", then the competition control to be described below is applied.

The count C1 is increased by 1 every time a time slot elapses; in time slot 4 it becomes greater than the threshold value T1. Therefore, in time slot 4 the readout section 35-1 is given the "right to read a cell out of the cell buffer 22-1". At this time, the cell 51 is stored in the cell buffer 22-1, so the readout section 35-1 reads out cell 51 and outputs it to the output line. At the same time, the count C1 is decreased by the threshold value T1. That is to say, in time slot 4, the count C1 becomes 4−3.25=0.75.

The same action is then repeated. That is to say, in each time slot the count C1 is increased by 1; when the count C1 becomes equal to or greater than the threshold value C1, if there is a cell stored in the cell buffer 22-1, that cell is read out and output to the output line, and, at the same time, the count C1 is decreased by the threshold value T1.

When the count C1 becomes equal to or greater than the threshold value T1 in time slots 4, 7, 10 and 13, if we assume that there is always a cell stored in the cell buffer 22-1, then the intervals at which cells are read out will agree with the threshold value T1. In the example shown in FIG. 9, 4 cells are read out from time slot 0 to time slot 13. Consequently, the average interval at which cells are read out becomes 13/4=3.25, in agreement with the threshold value T1.

After cell 55 has been read out in time slot 17, the count C1 is increased. Then, in time slot 20, the count C1 becomes greater than the threshold value T1, and the "right to read out of cell buffer 22-1" is given to the readout section 35-1. However, at this time, there are no cells stored in the cell buffer 22-1, so it is not possible for a cell to be read out. Thus, when the count C1 is equal to or greater than the threshold value T1, if there are no cells stored in the cell buffer 22-1, the count C1 is not increased but remains at the same value (This is under the above mentioned rule (c)).

Subsequently, the count C1 remains at that same value until a cell is written into the cell buffer 22-1; but, since the value at which the count is held is equal to or greater than the threshold value T1, the readout section 35-1 remains in possession of the "right to read a cell out of the cell buffer 22-1". Consequently, when the cell 56 is written into the cell buffer 22-1, the cell 56 is read out immediately.

The reason why the count C1 is not incremented if the count C1 is equal to or greater than the threshold value T1, and, in addition, there is no cell stored in the cell buffer 22-1, is as follows. If the count C1 is equal to or greater than the threshold value T1, and, in addition, a cell is not stored in the cell buffer 22-1, and if the count C1 continues to be incremented every time slot, then, if no cell is input, the count C1 will attain a large value. As an example, suppose that the count C1 increases to 40.

In this condition, if a large number of cells are written into the cell buffer 22-1 in a burst, since the count C1 is greater than the threshold value T1, every time a cell is read out of the cell buffer 22-1 the count C1 will be decreased by the threshold value T1. The first such decrease will be to 40−3.25=36.75. In the next time slot, since the count C1 is still greater than the threshold value T1, one cell will be read out of the cell buffer 22-1, and the count C1 will be decreased again by the threshold value T1, to 36.75−3.25=33.50. Subsequently, cells will continue to be read out of the cell buffer 22-1 until the count C1 becomes smaller than the threshold value T1. In this example, that is to say, under the assumption that the count C1 has increased to 40, cells will be read out of the cell buffer 22-1 in 12 consecutive time slots.

When cells are read out in a single quality class in consecutive time slots in this manner, the band used for cell transfer in that quality class exceeds the band needed to guarantee the quality required of that quality class. In this case, it becomes more likely that cells will be discarded in the device (such as an ATM switch) that receives the cells output from that quality control buffer. The reason for not incrementing the count C1 if the count C1 is equal to or greater than the threshold value T1 and, in addition, a cell is not stored in the cell buffer 22-1, is to avoid such discarding of cells.

The cell transfer rates for each quality class are regulated by the threshold values, by controlling the count for the quality control buffers of this embodiment as described above. This makes it possible to prevent the discarding of cells described above. However, if competition occurs as described below, the method of controlling the count becomes different.

Next, competition control will be explained. In this embodiment, the quality control buffer has a cell buffer for each of the plurality of quality control classes, and cells are read out of those cell buffers under specified conditions. However, reading out can only be done from 1 cell in 1 time slot, so that if a "condition in which a cell can be read out of a cell buffer" exists for a plurality of quality classes, there will be competition between quality classes.

Figure 10:
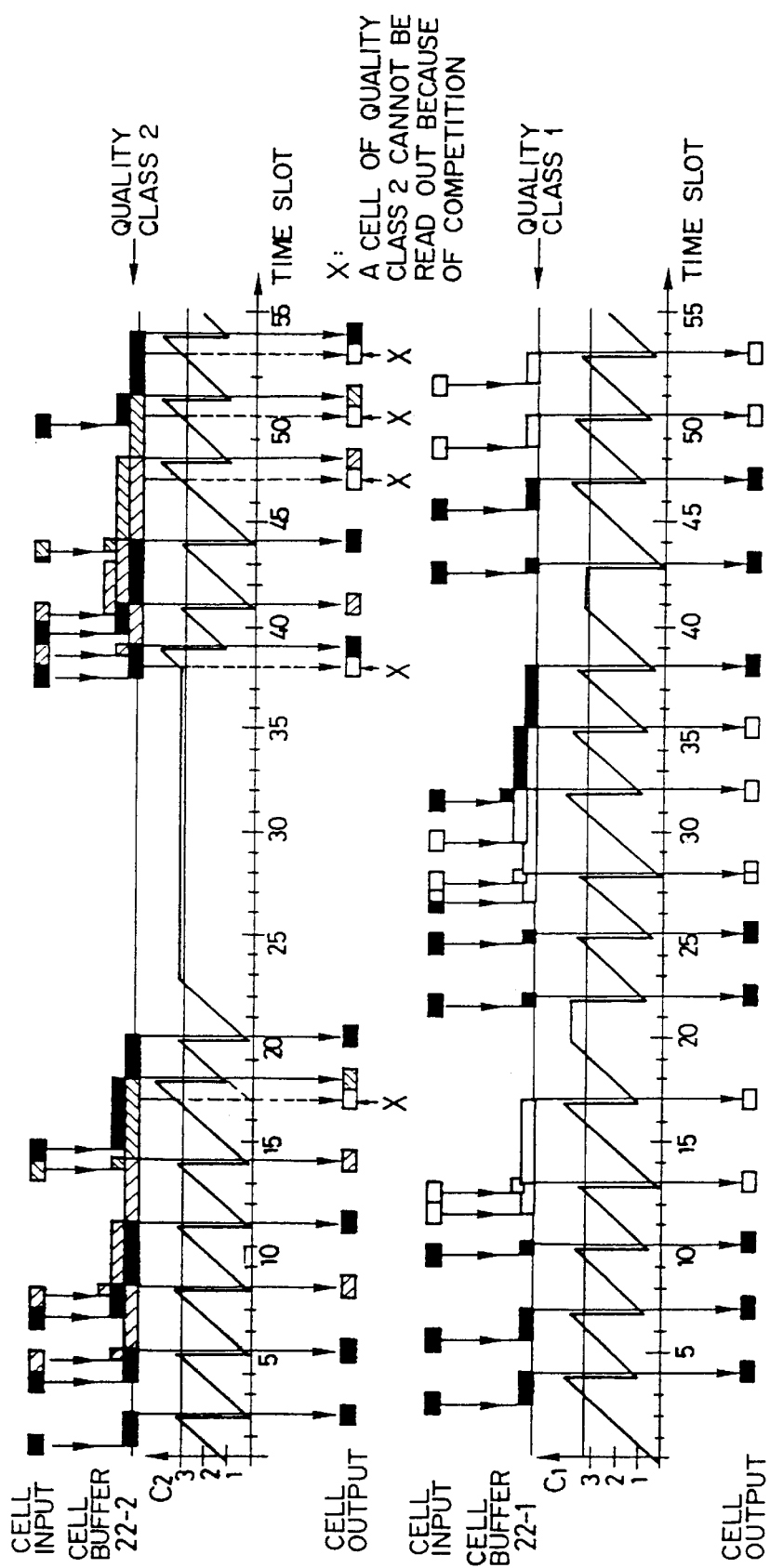
FIG. 10 A diagram explaining control of competition.

FIG. 10 is a diagram that explains competition control. In FIG. 10, competition between 2 quality classes is explained. Threshold values T1=3.25 and T2=3.00 are set for quality class 1 and quality class 2 respectively. In addition, priority information is preset for each quality class. Here a higher priority is assigned to quality class 1; if competition occurs between quality class 1 and quality class 2, the cell of quality class 1 will be read out. The cell counter counts for quality class 1 and quality class 2 are C1 and C2, respectively.

When competition does not occur, cells are read out and output to the output line for quality class 1 and quality class 2 by the action which was described referring to FIG. 9. Specifically, every time slot the counts C1 and C2 are incremented by 1; when the count C1 becomes equal to or greater than the threshold value T1, if a cell is stored in the cell buffer 22-1 then that cell is read out, while when the count C2 becomes equal to or greater than the threshold value T2, if a cell is stored in the cell buffer 22-2 then that cell is read out.

If competition occurs between quality class 1 and quality class 2, a cell is read out for quality class 1, to which the higher priority has been assigned. Suppose, for example, that in time slot 17 counts C1 and C2 both become equal to or greater than the respective threshold values T1 and T2, and, in addition, cells are stored in the corresponding cell buffers 22-1 and 22-2. That is to say, quality class 1 and quality class 2 are both in "a condition in which a cell can be read out", so that competition occurs. In this case, only the cell stored in the cell buffer 22-1 is read out.

In time slot 17, when the cell stored in the cell buffer 22-1 is read out, the count C1 is decreased by the threshold value T1. Meanwhile, in quality class 2, a cell is not read out; and the count C2 is increased by 1.

When competition does not occur, as was explained with reference to FIG. 8, if the count for a certain quality class is equal to or greater than the corresponding threshold value, that count is not increased as time elapses. However, if competition occurs, then, for a quality class for which a cell cannot be read out, in the time slot in which that cell could not be read out, the count is increased by 1.

Thus, in a quality class in which a cell cannot be read out because of competition, if the count is increased in that time slot, the average interval at which cells are read out can be controlled in accordance with the threshold value. For example, in quality class 2, the count C2 is increased from 3 to 4 in time slot 17. In time slot 18, a cell is read out of the cell buffer 22-2, and the count C2 is decreased by the threshold value T2, so that it becomes 1. After that, the count C2 is increased by 1 in each time slot, becoming 3 in time slot 20. Since the threshold value T2 is 3, the count C2 is equal to or greater than the threshold value T2, so that the cell stored in the cell buffer 22-2 is read out. As a result, for quality class 2, 2 cells will have been read out in time slots 14 to 20. If the readout interval of cells during this time is averaged, it works out that 1 cell has been read out every 3 time slots, in agreement with the threshold value T2.

The readout action when there is competition and the readout action when there is not competition will now be compared. When there is not competition, in quality class 2, in time slot 17 a cell is read out from the cell buffer 22-2, and the count C2 is decreased to 0 (shown by the dotted line). After that, the count C2 is increased by 1 each time slot until it becomes 3 in time slot 20. In time slot 20, the next cell is read out from the cell buffer 22-2. Thus, even when there is not competition, 2 cells are read out in time slots 14 to 20, the same as when there is competition.

Thus, in the case in which a cell could not be read out of cell buffer 22-2 because of competition, readout processing for quality class 2 is delayed until a time slot in which a cell of quality class 1 is not read out, but on the average, the upper limit of the quality class 2 readout rate is determined by the threshold value T2.

Next, override control will be explained. In the above explanation, when the count of the cell counter for a certain quality class becomes equal to or greater than the threshold value for that quality class, the "right to read a cell out" is given to that quality class. However, in the method explained above, even if cells are stored in cell buffers for a plurality of quality classes, if the counts for those quality classes are smaller than the corresponding threshold values, those cells will not be read out.

Override control is a technique which permits cells in a specified quality class to be read out without regard to the cell counter count when there is no quality class in "the condition in which a cell can be read out". In a certain specified quality class, the method by which a cell can be read out of the cell buffer even though the cell counter count is smaller than the threshold value is called "override readout".

Figure 11:
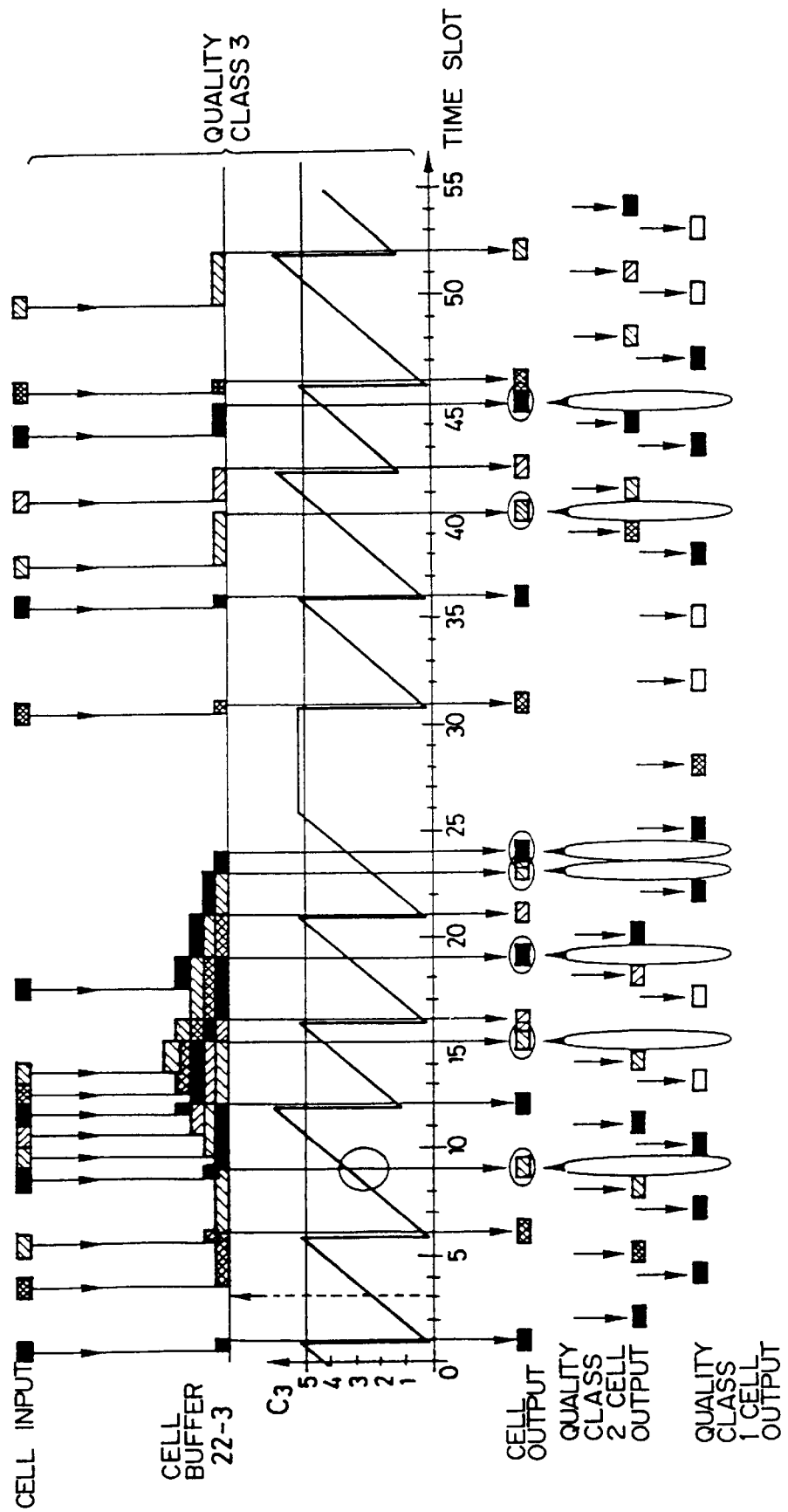
FIG. 11 A diagram explaining override control.

FIG. 11 is a diagram which explains override control. In FIG. 11, the action is the same as in FIG. 10 for quality classes 1 and 2; here, only the cell readout is shown. The threshold value for quality class 3 is set to T3=5.0. C3 is the count of the cell counter provided for quality class 3. In addition, the highest priority which relates to the competition control is assigned to quality class 1, and the lowest priority to quality class 3.

Quality class 3 is set for "override readout". This setting is stored in the override specification section 41 shown in FIG. 7. When "override readout" is set for quality class 3, then, in a time slot for which cell readout is not performed for quality classes 1 and 2 (an open time slot), a cell of quality class 3 can be read out even if the count C3 is smaller than the threshold value T3.

A specific explanation of override control will now be given with reference to FIG. 11. In time slots 1 and 6, the count C3 becomes equal to or greater than the threshold value T3, so, as in the method that was explained with reference to FIG. 9, cells of quality class 3 are read out. In addition, in time slots 4 and 7, a cell of quality class 1 is read out; while in time slots 2, 5 and 8, cells of quality class 2 are read out.

However, in, for example, time slots 3 and 9, the above conditions (a) and (b) are not satisfied for quality class 1 or 2. For example, in time slot 3, for quality class 1 the count C1 is smaller than the threshold value T1, while for quality class 2, there is no cell stored in the cell buffer 22-2. For this reason, no cells of quality classes 1 or 2 are read out in time slots 3 and 9. At this time, the count C3 for quality class 3 is smaller than T3. That is to say, in time slots 3 and 9, the count C3 is 2 and 3 respectively; both are smaller than the threshold value T3 (=5). For this reason, if we assume that no cell of quality class 3 is read out in time slot 3 or 9, those time slots become open time slots.

Override readout uses such open time slots. That is to say, in time slots 3 and 9, if a cell of quality class 3 is stored in the cell buffer, that cell is read out and output to the output line with the timing of the open time slot.

In time slot 3, override readout can be done for quality class 3, but since there are no cells stored in the cell buffer for quality class 3 (cell buffer 22-3), no cells are output. In time slot 9, a cell is stored in cell buffer 22-3, so that cell is read out and output.

When the ordinary cell readout processing (cell readout other than override readout) which was explained with reference to FIG. 9 and FIG. 10 is performed, as explained above the cell counter count is reduced by the threshold value. However, when override readout is performed, the count is not decreased by the threshold value; instead, one of the following happens:
(1) The count is increased by 1.
(2) The count is left unchanged.
(3) The count is set to 0.

FIG. 11 shows a system in which the count is increased by 1.

One type of service in which override readout can be effective is data communication between computers. In this kind of data communication, the quality requirement with respect to transfer delay is not very strict, so the priority which relates to the competition control is set low and override readout is specified. With these settings, cells that are transferred in the data communication can be read out when there is no readout for higher priority services (such as voice communication or motion picture communication) even at shorter intervals than the interval determined by the threshold value. This permits open bands (unused bands) to be used to send data efficiently.

In the example shown in FIG. 11, override readout is specified for one quality class, but it can also be specified for a plurality of quality classes. In this case, override priorities are assigned to the plurality of quality classes for which override readout is specified. In the example shown in FIG. 8, override is specified for quality classes 3 to 5 in a quality class control buffer that has 5 quality classes, with override priorities assigned in the order of classes 5, 4, 3 (5 being the highest).

With these settings, when override readout is performed, a cell of quality class 5 is read out. If no cell of quality class 5 is stored, then a cell of quality class 4 is read out. If no cell of quality class 5 or quality class 4 is stored, then a cell of quality class 3 is read out.

FIG. 12 shows the results of simulation with respect to delay in a quality control buffer. In this simulation, the quality class is taken to be 2, and the output line physical band is taken to be 149.76 Mbps (353207 cells/second). Further, it is assumed that no overflow occurs in the cell buffer for any quality class. The transmission path use rates for both quality classes 1 and 2 are 90%. The readout rates for quality classes 1 and 2 are 10 Mbps and 139.76 Mbps, respectively. These readout rates correspond to band RB in equation (1) above.

In method 1, cells of quality classes 1 and 2 are stored in a single cell buffer. In method 2, fixed readout bands are assigned to a cell buffer for quality class 1 and a cell buffer for quality class 2. In method 3-1, a high priority is assigned to quality class 1 and, at the same time, override is specified for quality class 1. In method 3-2, high priority is assigned to quality class 1 and, at the same time, override is specified for quality class 2.

As shown in FIG. 12, an average delay and 99% delay in method 3-1 or 3-2 are smaller than those in method 1 or 2. That is say, by introducing override control the overall delay can be reduced and efficient quality control performed.

Figure 13:
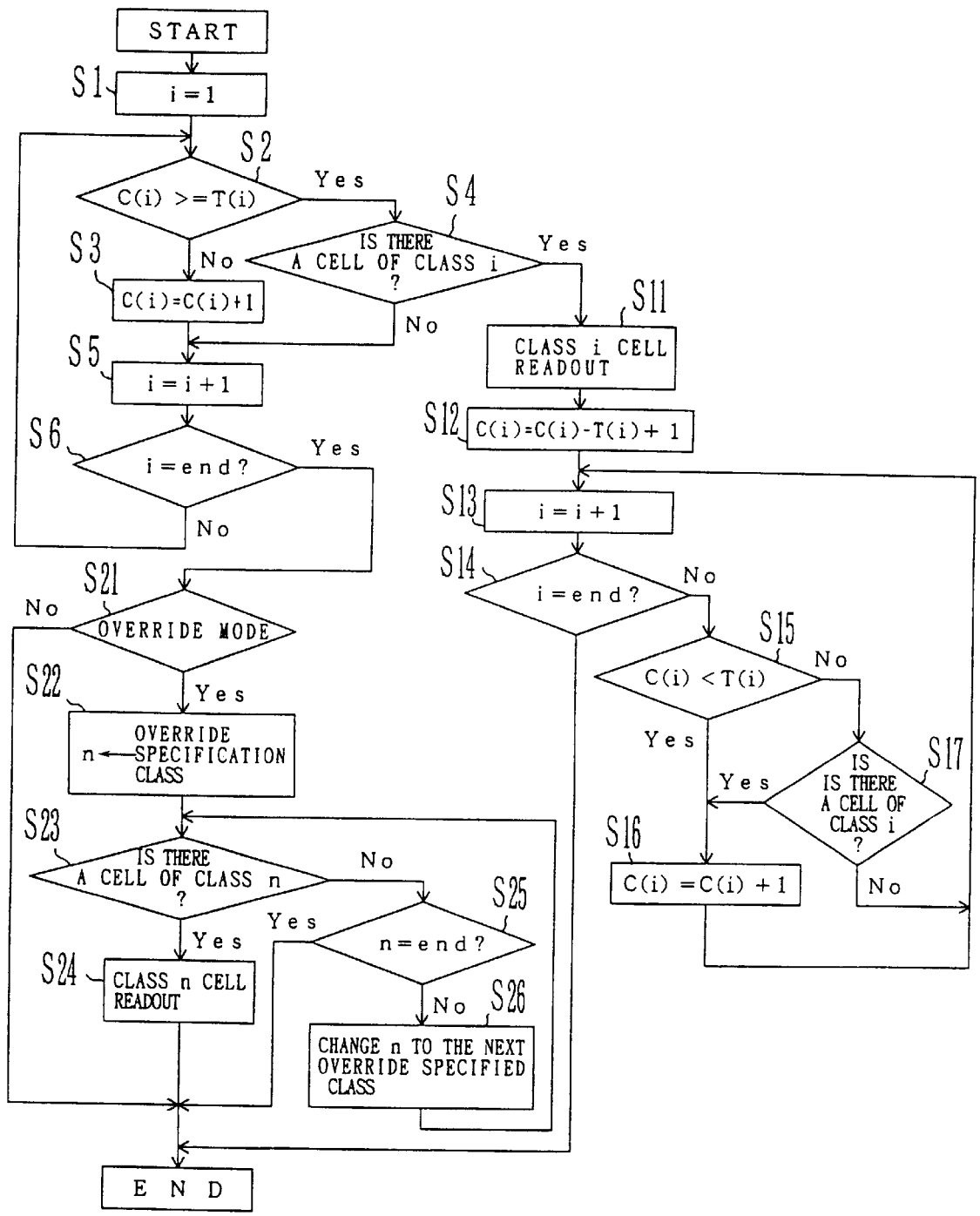
FIG. 13 A flow chart of cell readout processing.

FIG. 13 is a flow chart of the cell readout processing. This flow chart shows the processing in 1 time slot. Here the highest priority is assigned to quality class 1, followed in order by quality classes 2, 3, . . . .

In step S1, "i=1" is specified as the quality class. In step S2, the system investigates whether or not the count Ci for quality class i is equal to or greater than the threshold value Ti. If the count Ci is smaller than the threshold value Ti, then, in step S3, the count Ci is incremented, and flow proceeds to step 5. If the count Ci is equal to or greater than the threshold value Ti, then, if in step 4 it is determined that a cell for quality class i is not stored, flow proceeds to step S5. In step S5, i is increased to i+1 for processing the next quality class.

In step S6, the system investigates whether or not the processing of the steps S2 to S4 has been executed for all quality classes. If there is a quality class for which the processing has not been executed, flow returns to step S2; if, on the other hand, processing has been completed for all quality classes, flow proceeds to step S21.

In step S4, if it is determined that a cell of quality class i is stored, then, in step S11, that cell is read out, and, at the same time, the count Ci is decreased by the threshold value Ti and added by 1 in step S12.

In step S13, i is increased to i+1 for processing the next quality class. In step S14, the system investigates whether or not the processing of the steps S15 to S17 has been executed for all quality classes having lower priority than quality class i. If there is a quality class for which the processing has not been executed, flow proceeds to step S15; if, on the other hand, the processing has been executed for all classes, the processing in this time slot ends.

In step S15, the system investigates whether or not the count Ci for quality class i is smaller than the threshold value Ti. If the count Ci is smaller than the threshold value Ti, then, in step S16, the count Ci is incremented, and flow returns to step S13. If the count Ci is equal to or greater than the threshold value Ti, then, in step S17, the system investigates whether or not a cell is stored in a cell buffer of quality class i. If a cell is stored, flow proceeds to step S16; if, on-the other hand, a cell is not stored, flow returns to step S13.

That is, steps S15 to S17, for the quality classes that have lower priority than quality class i, if the count C is smaller than the threshold value T, the count C is incremented; meanwhile, in case that the count C is equal to or greater than the threshold value T, if a cell is stored for the class, the count C is incremented, if a cell is not stored for the class, the count C is unchanged.

In step S21, the system investigates whether or not there is a quality class for which override readout is specified. If there is not any quality class for which override readout is specified, then the processing for this time slot ends. In this case, a cell is not read out in this time slot. If there is a quality class for which override readout is specified, then the system goes into override mode and, in step S22, the system determines which quality class n has the highest override priority.

In step S23, the system determines whether or not a cell of quality class n is stored; if one is stored, then, in step S24, that cell is read out and the processing in this time slot ends.

If there is no cell of quality class n stored, then, in step S25, the system investigates whether or not the processing starting with step S23 has been carried out for all quality classes for which override readout has been specified. If the processing has been executed for all such quality classes, then the processing in this time slot ends. On the other hand, if there is a quality class for which override readout has been specified and the processing has not yet been executed, then, in step S26, the other quality classes for which override readout has been specified are determined and flow returns to step S23.

Figure 14:
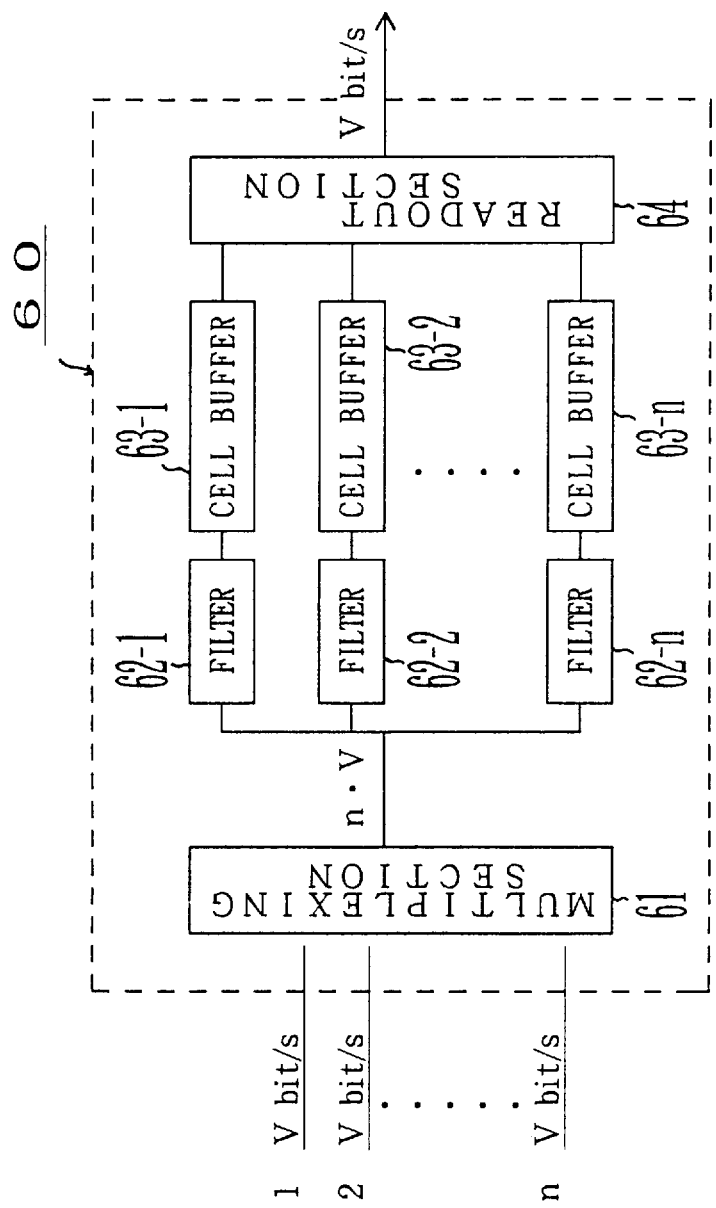
FIG. 14 A block diagram showing the configuration when the quality control buffer is placed on the input side (the multiplex concentrating section) of the ATM switch.

FIG. 14 is a block diagram that shows a configuration in which the quality control buffer is installed on the input side (the multiplex concentrating section) of the ATM switch. This quality control buffer corresponds to the quality control buffer 60 shown in FIG. 3.

The multiplexing section 61 multiplexes the cells input from n input lines and transfers them to filters 62-1 to 62-n. Filters 62-1 to 62-n refer to the tag information of each cell that is input and pass cells of quality classes 1 to n, respectively. Cell buffers 63-1 to 63-n store the cells that passed through the respective filters 62-1 to 62-n. The readout section 64 reads cells out from cell buffers 63-1 to 63-n, according to the method described with reference to FIG. 13, and outputs them to the output line. The readout section 64 includes the buffer length counter 31 shown in FIG. 7, the threshold setting section 32, the cell counter 33, the comparator 34, the readout section 35, the override specification section 41, the override control section 42, and the competition control section 43.

The readout section 64 assigns readout bands for each quality class to the output line physical band (in FIG. 14, this is shown as V; it might, for example, be 2.4 Gbps). The readout bands for each quality class are taken to be the bands that guarantee the quality, such as delay and cell loss rate, required for each quality class.

When a call is established, the band used and the type of service are declared. Since the quality class is determined by this type of service, the quality required for that call, such as the delay and the cell loss rate, are recognized. Then the declared band is used to calculate the band that can guarantee the quality of service required for that call. Since information relating to all calls is managed by the CAC, the band that will guarantee the quality required by each quality class can be calculated.

For example, suppose that the physical band of the quality control buffer output line is 2.4 Gbps and that the number of quality classes is 3. Here, if we take the readout bands of quality classes 1 to 3 to be 0.9 Gbps, 0.3 Gbps and 0.9 Gbps, respectively, then the threshold values T1 to T3 for quality classes 1 to 3 are 2.67, 8.0 and 2.67, respectively. When these threshold values are set, the average readout intervals for quality classes 1 to 3 are 2.67 time slots, 8.0 time slots, and 2.67 time slots, respectively.

Figure 15:
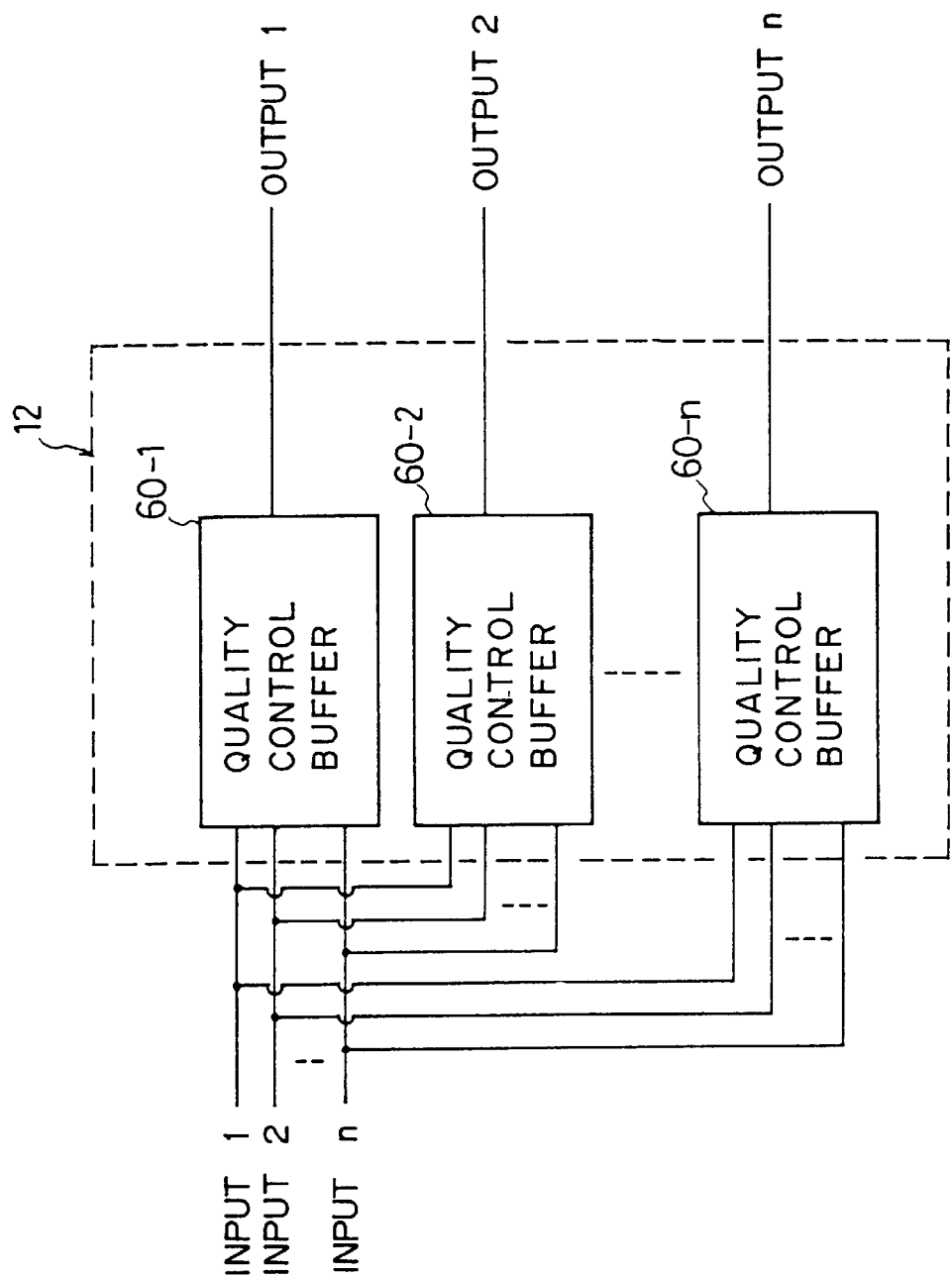
FIG. 15 A block diagram showing an example of ATM switch configuration using a quality control buffer.

FIG. 15 is a block diagram that shows an example in which the ATM switch is configured using the quality control buffer. The ATM switch shown in FIG. 15 consists of n×n switches; accordingly the configuration uses n of the quality control buffers 60 shown in FIG. 14.

Figure 16:
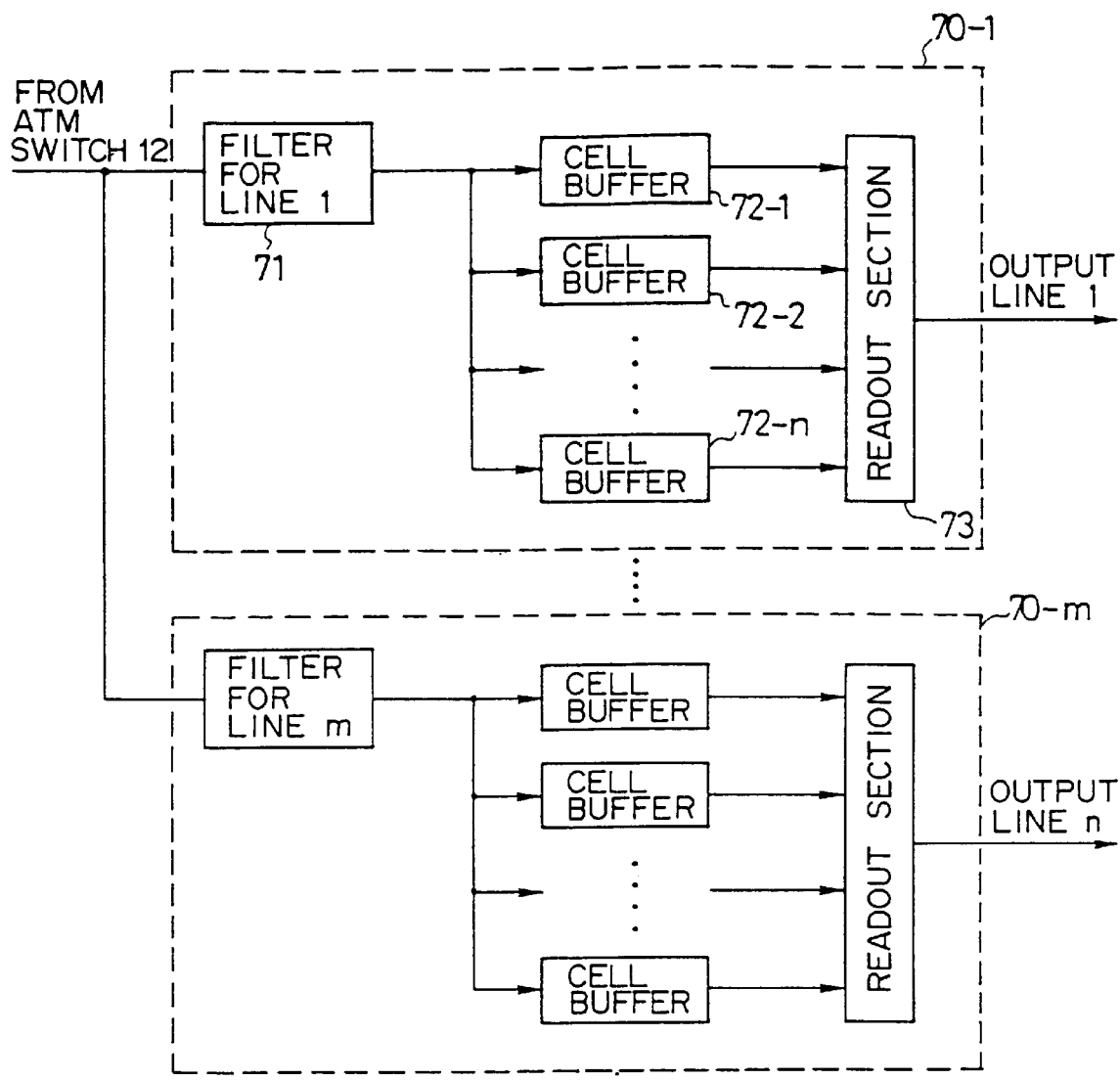
FIG. 16 A block diagram showing the configuration when the quality control buffer is placed on the output side (the multiplex distributing section) of the ATM switch.

FIG. 16 is a block diagram showing a configuration in which the quality control buffer is installed on the output side (multiplex distributing section) of the ATM switch. This quality control buffer corresponds to the quality control buffer 70 shown in FIG. 3. FIG. 16 shows a configuration in which the output highway of the ATM switch 12 is divided into m output lines. The quality control buffers 70-1 to 70-m are basically the same as the quality control buffer 60 in the multiplex concentrating section shown in FIG. 14.

The filter 71 used for output line 1 passes only those cells, among cells output from the ATM switch 12, for which the tag information specifies output line 1. The cell buffers 72-1 to 72-n store cells of quality classes 1 to n respectively. The filters 62-1 to 62-n shown in FIG. 14 are omitted from FIG. 16. The readout section 73 reads cells out from the cell buffers 72-1 to 72-n according to the method explained with reference to FIG. 13, and outputs them to the output line.

Figure 17:
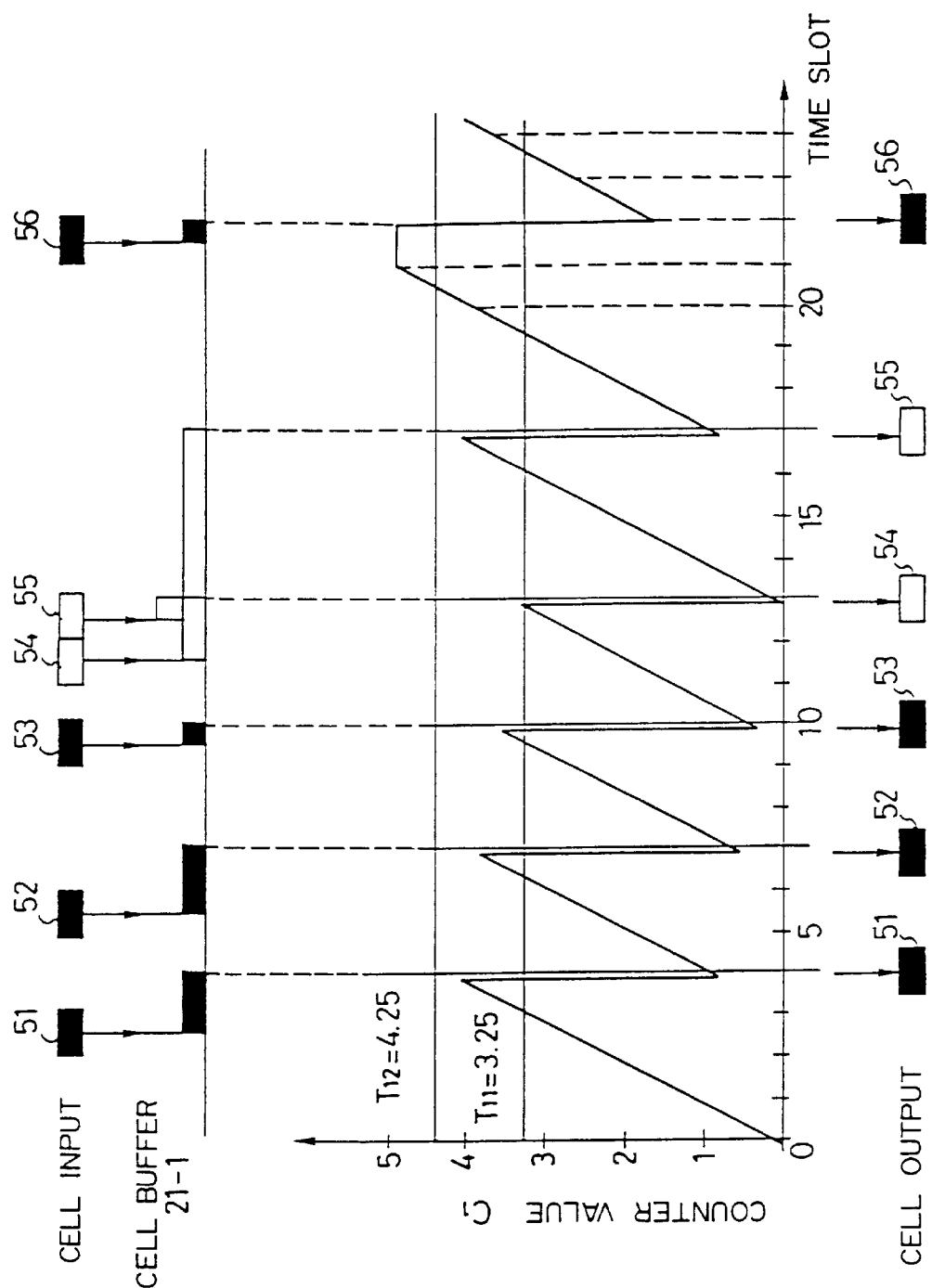
FIG. 17 A diagram explaining the action of a quality control buffer that absorbs fluctuations in the intervals between input cells.

FIG. 17 is a diagram that explains the action of the quality control buffer that absorbs fluctuations in cell intervals. The cell input timing is the same as in the example shown in FIG. 9.

In this method, 2 threshold values are set for each of the quality classes. In the example shown in FIG. 17, the threshold value T11 is set to 3.25 and the threshold value T12 is set to 4.25.

The count C1 is increased by 1 for each time slot. If a cell is stored in cell buffer 22-1 when the count C1 becomes equal to or greater than the threshold value T11, that cell is read out, and, at the same time, the count C1 is decreased by the threshold T11. This action is the same as that shown in FIG. 9.

In the time slot in which the count C1 becomes equal to or greater than the threshold value T11, if a cell is not stored in the cell buffer 22-1 then the count C1 is compared to the threshold value T12. For example, if, as shown for time slot 20, the count C1 is smaller than the threshold value T12, the count C1 is increased by 1. If, on the other hand, as shown for time slot 21, the count C1 is equal to or greater than the threshold value T12, the count C1 remains unchanged. After that, if a cell 56 is stored in cell buffer 22-1 in time slot 22, that cell 56 is read out and, at the same time, the count C1 is decreased by the threshold value T11.

FIG. 9 and FIG. 17 will now be compared. In FIG. 9, after cell 56 is read out, the count C1 becomes equal to or greater than the threshold value T1 3 time slots later. In contrast, in FIG. 17, the count C1 becomes equal to or greater than the threshold value T11 2 time slots after cell 56 is read out. That is to say, in the method shown in FIG. 17, compared to the method shown in FIG. 9, the "condition in which a cell can be read out" occurs 1 time slot earlier. Consequently, in the method shown in FIG. 17, if fluctuation occurs in the interval between cells input into the quality control buffer, fluctuation of more time slots can be absorbed than in the method shown in FIG. 9.

Figure 18:
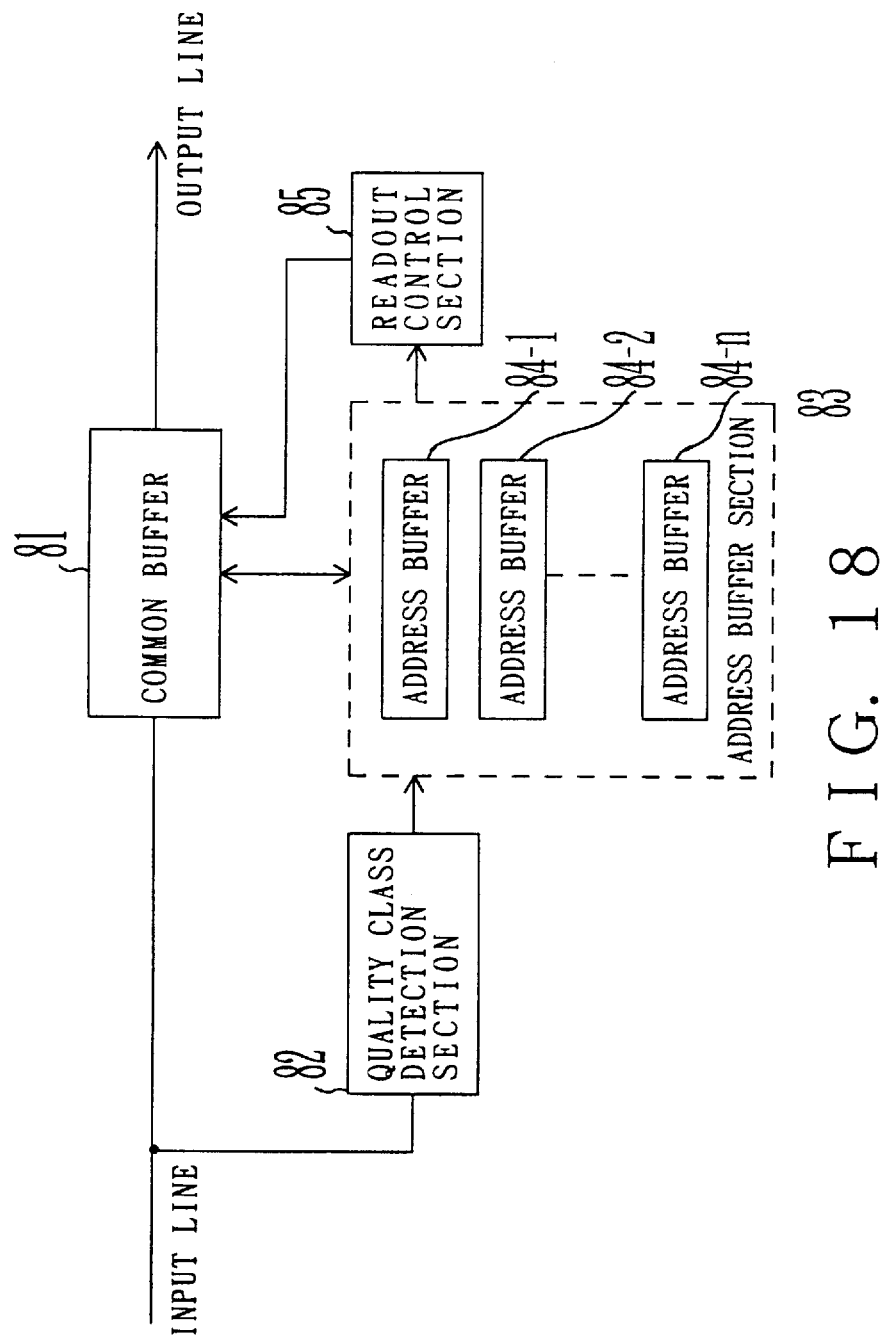
FIG. 18 A block diagram showing the configuration when a common buffer is used as the quality control buffer.

FIG. 18 is a block diagram of the case in which a common buffer is used as the quality control buffer. In the configuration described above, a cell buffer is provided for each quality class, and input cells are stored in the cell buffer specified for that quality class. In contrast, in the common buffer configuration shown in FIG. 18, cells that are input are all stored in the common buffer, and the addresses into which cells are written into that common buffer are managed for each quality class.

Cells that are input from the input line are stored in the common buffer 81, and the storage addresses are posted to the address buffer section 83. The quality class detection section 82 detects the quality classes of the cells that are input, and posts the results to the address buffer section 83.

The address buffer section 83 has address buffers 84-1 to 84-n provided for each quality class. The addresses at which cells are written in the common buffer 81 are stored in the address buffers 84-1 to 84-n according to the quality class of each cell. For example, when a cell of quality class 1 is input, the address in the common buffer 81 into which that cell is written is stored in the address buffer 84-1.

The readout control section 85 fetches the addresses in which cells are written from the address buffers 84-1 to 84-n, then uses those addresses to fetch the cells from the common buffer 81.

If a common buffer configuration such as that described above is used, the amount of memory capacity needed to store cells can be reduced.

As explained above, according to this invention, in a network in which a variety of communication services are handled together, a convenient communication service is provided to the user by providing a control system to guarantee the quality required by each of the communication services. In addition, while the quality of each quality class is being guaranteed, it has been made possible to transfer cells of specified quality classes using open time slots, making it possible to increase the efficiency of use of exchange equipment and transmission paths.

what is claimed is:

1. A quality control system which, in a network which autonomously exchanges fixed-length packets each consisting of a header field that includes routing information and an information field, controls the quality of a plurality of quality classes into which the communication services which the network provides are classified, comprising:
   a plurality of buffers, provided for each quality class, for storing the fixed-length packets;
   a plurality of counters, provided for each of said plurality of buffers, with a specified threshold value set for each; and
   control means for incrementing the counts of said plurality of counters every time the unit of time required to process one fixed-length packet elapses, reading a fixed-length packet out of a buffer among said plurality of buffers when a count of a counter provided corresponding for the buffer becomes equal to or greater than the threshold value of the counter, and decreasing the count of the counter by the threshold value.

2. The quality control system according to claim 1 wherein, if no fixed-length packet is stored in a buffer for which the corresponding count is equal to or greater than the threshold value, said control means does not increment the count of the counter.

3. The quality control system according to claim 1 wherein each threshold value is set in accordance with equation (1); Ti (i=1, 2, 3, . . . ) is the threshold value set for said plurality of counters, RBi is the band in which the required quality can be guaranteed for each quality class, and PB is the output line physical band.

$$Ti = PB/RBi \qquad (1)$$

4. The quality control system according to claim 1 wherein priorities are assigned to each of the plurality of quality classes; if fixed-length packets are stored in first and second buffers and the counts of first and second counters provided corresponding for the first and second buffers are equal to or greater than the corresponding threshold values, said control means reads a fixed-length packet out of the first buffer when a priority assigned to a quality class corresponding to the first buffer is higher than a priority assigned to a quality class corresponding to the second buffer.

5. The quality control system according to claim 4 wherein said control means increments the counts of the second counter.

6. The quality control system according to claim 1 wherein a right to preferentially use open time slots is given to at least one of the quality classes; and
   when there is no quality class in the condition in which a fixed-length packet can be read out, said control means reads a fixed-length packet out of the buffer for the quality class to which the right has been given.

7. The quality control system as described in claim 1 wherein rights to preferentially use open time slots are given to a plurality of quality classes, and an order of priority is assigned to the rights; and
   when there is no quality class in the condition in which a fixed-length packet can be read out, said control means reads a fixed-length packet out of a buffer that corresponds to one of the plurality of quality classes to which the rights have been given and, in addition, has a highest priority among buffers in which fixed-length packets are stored.

8. The quality control system as described in claim 1 wherein a right to preferentially use an open time slot is given to at least one quality class, and
   if none of the fixed-length packets are stored in a buffer corresponding to a counter for which the count is equal to or greater than the corresponding threshold value, said control means reads a fixed-length packet out from the buffer of a quality class to which the right has been given.

9. The quality control system as described in claim 6 wherein said control means, when processing the readout of a fixed-length packet from a buffer for a quality class to which the right has been given, does not decrease the count of the corresponding counter if the count for the quality class is less than the threshold value.

10. The quality control system as described in claim 6 wherein said control means, when processing the readout of a fixed-length packet from a buffer for a quality class to which the right has been given, sets the count to 0 if the count for that quality class is less than the threshold value.

11. The quality control system as described in claim 6 wherein the right can be set for each quality class.

12. The quality control system as described in claim 6 wherein for each quality class, competition priorities and the right to preferentially use open time slots can be set independently.

13. A quality control system which, in a network which autonomously exchanges fixed-length packets each consisting of a header field that includes routing information and an information field, controls the quality of a plurality of quality classes into which the communication services which the network provides are classified, comprising:

a plurality of buffers, provided for each quality class, for storing the fixed-length packets;

a plurality of counters, provided for each of said plurality of buffers, with a specified first threshold value and a specified second threshold value that is larger than the first threshold value, set for each; and control means (a) for incrementing the counts of said plurality of counters every time the unit of time required to process one fixed-length packet elapses, (b) for reading a fixed-length packet out of a buffer among said plurality of buffers if a fixed-length packet is stored in the buffer and a count of a counter corresponding to the buffer is equal to or greater than the first threshold value and for decreasing the count by the first threshold value, (c) keeping the count unchanged if there is no fixed-length packet stored in any buffer corresponding to a counter for which the count is equal to or greater than the second threshold value.

14. A quality control system which, in a network which autonomously exchanges fixed-length packets each consisting of a header field that includes routing information and an information field, controls the quality of a plurality of quality classes into which communication services which the network provides are classified, comprising:

a common buffer for storing the fixed-length packets;

a plurality of address buffers, provided for each quality class, for storing a storage address of said common buffer into which a fixed-length packet being written according to a quality class;

a plurality of counters, provided for each of the plurality of address buffers, each of said plurality of counters being specified a threshold value; and control means for incrementing the counts of said plurality of counters every time the unit of time required to process one fixed-length packet, fetching a storage address from an address buffer among said plurality of address buffers when a count of a counter provided corresponding to the address buffer is equal to or greater than the threshold value, fetching a fixed-length packet from said common buffer using the fetched storage address, and decreasing the count of the counter by the threshold value.

15. The quality control system as described in claim 14 wherein if there is no storage address stored in an address buffer for which the corresponding count is equal to or greater than the threshold value, said control means does not increment the count.

16. The quality control system as described in claim 14 wherein the threshold values are set according to equation (2); Ti (i=1, 2, 3, . . . ) is the threshold value set for each of said counters, RBi is the band for which the quality required by each quality class is guaranteed, and PB is the output line physical band.

$$Ti = PB/RBi \qquad (2)$$

17. The quality control system as described in claim 14 wherein priorities are set for each of the plurality of quality classes; if storage addresses are stored in first and second address buffers and the counts of first and second counters provided corresponding for the first and second address buffers are equal to or greater than the corresponding threshold values, said control means fetches a storage address from the first address buffer, when a priority assigned to a quality class corresponding to the first address buffer is higher than a priority assigned to a quality class corresponding to the second address buffer.

18. The quality control system as described in claim 17 wherein said control means increments the count of second counter.

19. The quality control system as described in claim 14 wherein a right to preferentially use open time slots is given to a specified quality class; and when there is no quality class in a condition in which a storage address can be fetched, said control means fetches a storage address from the address buffer for the quality class to which the right has been given.

20. The quality control system as described in claim 14 wherein rights to preferentially use open time slots are given to a plurality of quality classes, and order of priorities are assigned to the rights; and when there is no quality class in a condition in which a storage address can be fetched, said control means fetches a storage address from an address buffer that corresponds to one of the plurality of quality classes to which the rights have been given and, in addition, is the quality class for which the address buffer has the highest of the priorities.

21. The quality control system as described in claim 14 wherein a right to preferentially use open time slots is given to a specified quality class; and if there is no storage address stored in an address buffer corresponding to a counter for which the count is equal to or greater than the threshold value, said control means fetches a storage address from the address buffer for the quality class to which the right has been given.

22. The quality control system as described in claim 19 wherein when said control means processes the fetching of a storage address from the address buffer of the quality class to which the right has been given, if the count for that quality class is less than the threshold value, that count is not decreased.

23. The quality control system as described in claim 19 wherein when said control means processes the fetching of a storage address from the address buffer of the quality class to which the right has been given, if the count for that quality class is less than the threshold value, that count is set to 0.

24. The quality control system as described in claim 19 wherein the right can be set separately for each quality class.

25. The quality control system as described in claim 19 wherein for each quality class, competition priorities and the right to preferentially use open time slots can be set independently.

26. A quality control system, in a network which autonomously exchanges fixed-length packets each consisting of a header field that includes routing information and an information field in accordance with the routing information, which controls the quality of quality classes into which the communication services provided by the network are classified, comprising:

storing means for storing the fixed-length packets; and management means for setting the number of the fixed-length packets to be read out in fixed time intervals for each quality class, and managing the readout of the fixed-length packets from said storing means for each quality class in accordance with the set number, wherein when the number of the fixed-length packets available to be read out in the fixed time interval is less than the set number, the number of the fixed-length packets that could not be read out is stored, and readout is suspended in accordance with the setting until readout of the stored number of the fixed-length packets is completed.

27. A quality control method, performed in a network which exchanges fixed-length packets, controlling the quality of a plurality of quality classes into which the communication services which the network provides are classified, comprising the steps of:

providing a plurality of buffers for each quality class;

storing a fixed-length packet in a buffer among the plurality of buffers according to the quality class of the fixed-length packet;

providing a plurality of counters for each of the plurality of buffers;

setting threshold values for each of the plurality of counters;

incrementing the counts of the plurality of counters every time the unit of time required to process one fixed-length packet elapses;

reading a fixed-length packet out of a buffer among the plurality of buffers when a count of a counter provided corresponding for the buffer becomes equal to or greater than the threshold value of the counter; and decreasing the count of the counter by the threshold value.

28. The quality control method according to claim 27 further comprising the steps of:

assigning priorities to each of the plurality of quality classes; and reading, if fixed-length packets are stored in first and second buffers and the counts of first and second counters provided corresponding for the first and second buffers are equal to or greater than the corresponding threshold values, a fixed-length packet out of the first buffer when a priority assigned to a quality class corresponding to the first buffer is higher than a priority assigned to a quality class corresponding to the second buffer.

29. The quality control method according to claim 27 further comprising the steps of:

assigning a right to preferentially use an open time slot to at least one quality class; and reading, if no fixed-length packets are stored in a buffer corresponding to a counter for which the count is equal to or greater than the corresponding threshold value, a fixed-length packet out from the buffer of a quality class to which the right has been given.

* * * * *